US011910052B2

(12) United States Patent
Wells et al.

(10) Patent No.: US 11,910,052 B2
(45) Date of Patent: *Feb. 20, 2024

(54) ENTRY DEVICE FOR COMMUNICATING EXTERNAL NETWORK SIGNALS AND IN-HOME NETWORK SIGNALS

(71) Applicant: PPC BROADBAND, INC., East Syracuse, NY (US)

(72) Inventors: Chad T. Wells, Centennial, CO (US); John M. Egan, Jr., Franktown, CO (US); Gregory F. Halik, Empire, MI (US); Charles F. Newby, Evergreen, CO (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,188

(22) Filed: Dec. 13, 2022

(65) Prior Publication Data

US 2023/0109851 A1 Apr. 13, 2023

Related U.S. Application Data

(63) Continuation of application No. 17/159,919, filed on Jan. 27, 2021, now Pat. No. 11,528,526, which is a (Continued)

(51) Int. Cl.
*H04N 7/18* (2006.01)
*H04N 21/436* (2011.01)
(Continued)

(52) U.S. Cl.
CPC ... *H04N 21/43615* (2013.01); *H04L 12/2801* (2013.01); *H04N 7/104* (2013.01); (Continued)

(58) Field of Classification Search
CPC ......... H04N 21/43615; H04N 21/6118; H04N 21/6168; H04N 21/63
See application file for complete search history.

(56) References Cited

U.S. PATENT DOCUMENTS 2,662,217 A 12/1953 Roberts
3,790,909 A 2/1974 Le Fevre
(Continued)

FOREIGN PATENT DOCUMENTS

CN 200941620 Y 8/2007
CN 201048432 Y 4/2008
(Continued)

OTHER PUBLICATIONS

Office Action Summary dated Jan. 23, 2012, U.S. Appl. No. 12/250,229, filed Oct. 13, 2008, pp. 1-25.
(Continued)

*Primary Examiner* — Gigi L Dubasky
(74) *Attorney, Agent, or Firm* — MH2 TECHNOLOGY LAW GROUP LLP

(57) ABSTRACT

A cable television (CATV) entry adapter connects to a CATV network and serves as a hub in an In-Home Entertainment (IHE) network. IHE signals may be communicated between passive and active ports of an embodiment of the entry adapter through a pair of directional couplers which allow an IRE-enabled embedded multimedia terminal device (eMTA) at the passive port to communicate with multimedia devices of the IHE network connected to the active ports. An IHE frequency rejection filter is used in some embodiments to confine IHE signal to a single subscriber premise. In some embodiments a bidirectional IHE bandpass filter is used to enable IHE signals to pass between the passive and active ports of the CATV entry adapter.

18 Claims, 8 Drawing Sheets

Related U.S. Application Data continuation of application No. 16/564,949, filed on Sep. 9, 2019, now Pat. No. 10,917,685, which is a continuation of application No. 15/880,231, filed on Jan. 25, 2018, now Pat. No. 10,419,813, which is a continuation of application No. 15/722,302, filed on Oct. 2, 2017, now Pat. No. 10,154,302, which is a continuation of application No. 15/133,948, filed on Apr. 20, 2016, now Pat. No. 9,781,472, which is a continuation of application No. 13/863,693, filed on Apr. 16, 2013, now Pat. No. 9,351,051, which is a continuation-in-part of application No. 12/704,833, filed on Feb. 12, 2010, now Pat. No. 8,429,695, which is a continuation-in-part of application No. 12/255,008, filed on Oct. 21, 2008, now Pat. No. 8,286,209, said application No. 13/863,693 is a continuation-in-part of application No. 13/688,420, filed on Nov. 29, 2012, now Pat. No. 9,167,286, which is a continuation-in-part of application No. 12/563,719, filed on Sep. 21, 2009, now Pat. No. 8,356,322.

(51) Int. Cl.
  H04N 21/63     (2011.01)
  H04L 12/28     (2006.01)
  H04N 21/61     (2011.01)
  H04N 7/10      (2006.01)

(52) U.S. Cl.
  CPC ..... *H04N 21/6118* (2013.01); *H04N 21/6168* (2013.01); *H04N 21/63* (2013.01)

(56) References Cited

U.S. PATENT DOCUMENTS

| | | |
|---|---|---|
| 3,939,431 A | 2/1976 | Cohlman |
| 4,027,219 A | 5/1977 | Van Alphen et al. |
| 4,306,403 A | 12/1981 | Hubbard et al. |
| 4,344,499 A | 8/1982 | Van der Lely et al. |
| 4,418,424 A | 11/1983 | Kawamoto et al. |
| 4,512,033 A | 4/1985 | Schrock |
| 4,520,508 A | 5/1985 | Reichert, Jr. |
| 4,521,920 A | 6/1985 | Forsberg et al. |
| 4,648,123 A | 3/1987 | Schrock |
| 4,677,390 A | 6/1987 | Wagner |
| 4,715,012 A | 12/1987 | Mueller, Jr. |
| 4,961,218 A | 10/1990 | Kiko |
| 4,982,440 A | 1/1991 | Dufresne et al. |
| 5,010,399 A | 4/1991 | Goodman et al. |
| 5,126,686 A | 6/1992 | Tam |
| 5,126,840 A | 6/1992 | Dufresne et al. |
| 5,214,505 A | 5/1993 | Rabowsky et al. |
| 5,231,660 A | 7/1993 | West, Jr. |
| 5,235,612 A | 8/1993 | Stilwell et al. |
| 5,245,300 A | 9/1993 | Sasaki et al. |
| 5,345,504 A | 9/1994 | West, Jr. |
| 5,361,394 A | 11/1994 | Shigihara |
| 5,369,642 A | 11/1994 | Shioka et al. |
| 5,389,882 A | 2/1995 | I'Anson et al. |
| 5,485,630 A | 1/1996 | Lee et al. |
| 5,548,255 A | 8/1996 | Spielman |
| 5,557,319 A | 9/1996 | Gurusami et al. |
| 5,557,510 A | 9/1996 | McIntyre et al. |
| 5,604,528 A | 2/1997 | Edwards et al. |
| 5,719,792 A | 2/1998 | Bush |
| 5,740,044 A | 4/1998 | Ehrenhardt et al. |
| 5,745,836 A | 4/1998 | Williams |
| 5,745,838 A | 4/1998 | Tresness et al. |
| 5,815,794 A | 9/1998 | Williams |
| 5,818,825 A | 10/1998 | Corrigan et al. |
| 5,839,052 A | 11/1998 | Dean et al. |
| 5,893,024 A | 4/1999 | Sanders et al. |
| 5,937,330 A | 8/1999 | Vince et al. |
| 5,950,111 A | 9/1999 | Georger et al. |
| 5,956,075 A | 9/1999 | Matsuo |
| 5,970,053 A | 10/1999 | Schick et al. |
| 6,012,271 A | 1/2000 | Wilkens et al. |
| 6,014,547 A | 1/2000 | Caporizzo et al. |
| 6,049,693 A | 4/2000 | Baran et al. |
| 6,069,960 A | 5/2000 | Mizukami et al. |
| 6,094,211 A | 7/2000 | Baran et al. |
| 6,101,932 A | 8/2000 | Wilkens |
| 6,128,040 A | 10/2000 | Shinbori et al. |
| 6,129,187 A | 10/2000 | Bellanger et al. |
| 6,160,990 A | 12/2000 | Kobayashi et al. |
| 6,173,225 B1 | 1/2001 | Stelzle et al. |
| 6,185,432 B1 | 2/2001 | Vembu |
| 6,205,138 B1 | 3/2001 | Nihal et al. |
| 6,229,375 B1 | 5/2001 | Koen |
| 6,253,077 B1 | 6/2001 | Burt et al. |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,430,904 B1 | 8/2002 | Coers et al. |
| 6,495,998 B1 | 12/2002 | Terreault |
| 6,498,925 B1 | 12/2002 | Tauchi |
| 6,510,152 B1 | 1/2003 | Gerszberg et al. |
| 6,545,564 B1 | 4/2003 | Coppola |
| 6,546,705 B2 | 4/2003 | Scarlett et al. |
| 6,550,063 B1 | 4/2003 | Matsuura |
| 6,560,778 B1 | 5/2003 | Hasegawa |
| 6,570,914 B1 | 5/2003 | Ichihara |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,678,893 B1 | 1/2004 | Jung |
| 6,683,513 B2 | 1/2004 | Shamsaifar et al. |
| 6,725,462 B1 | 4/2004 | Kaplan |
| 6,725,463 B1 | 4/2004 | Birleson |
| 6,728,968 B1 | 4/2004 | Abe et al. |
| 6,737,935 B1 | 5/2004 | Shafer |
| 6,757,910 B1 | 6/2004 | Bianu |
| 6,758,292 B2 | 7/2004 | Shoemaker |
| 6,804,828 B1 | 10/2004 | Shibata |
| 6,843,044 B2 | 1/2005 | Clauss |
| 6,845,232 B2 | 1/2005 | Darabi |
| 6,868,552 B1 | 3/2005 | Masuda et al. |
| 6,877,166 B1 | 4/2005 | Roeck et al. |
| 6,880,170 B1 | 4/2005 | Kauffman et al. |
| 6,915,530 B1 | 7/2005 | Kauffman et al. |
| 6,920,614 B1 | 7/2005 | Schindler et al. |
| 6,928,175 B1 | 8/2005 | Bader et al. |
| 6,942,595 B2 | 9/2005 | Hrazdera |
| 7,003,275 B1 | 2/2006 | Petrovic |
| 7,029,293 B2 | 4/2006 | Shapson et al. |
| 7,039,432 B2 | 5/2006 | Strater et al. |
| 7,048,106 B2 | 5/2006 | Hou |
| 7,127,734 B1 | 10/2006 | Amit |
| 7,162,731 B2 | 1/2007 | Reidhead et al. |
| 7,167,693 B2 | 1/2007 | Bachman, II et al. |
| 7,254,827 B1 | 8/2007 | Terreault |
| 7,283,479 B2 | 10/2007 | Ljungdahl et al. |
| 7,399,255 B1 | 7/2008 | Johnson et al. |
| 7,404,355 B2 | 7/2008 | Viaud et al. |
| 7,416,068 B2 | 8/2008 | Ray et al. |
| 7,454,252 B2 | 11/2008 | El-Sayed |
| 7,464,526 B2 | 12/2008 | Coenen |
| 7,505,819 B2 | 3/2009 | El-Sayed |
| 7,508,284 B2 | 3/2009 | Shafer |
| 7,530,091 B2 | 5/2009 | Vaughan |
| 7,592,883 B2 | 9/2009 | Shafer |
| 7,603,693 B2 | 10/2009 | Masuda et al. |
| 7,675,381 B2 | 3/2010 | Lin |
| 7,742,777 B2 | 6/2010 | Strater et al. |
| 7,748,023 B2 | 6/2010 | Weinstein et al. |
| 7,783,195 B2 | 8/2010 | Riggsby |
| 7,912,431 B2 | 3/2011 | Phillips et al. |
| 8,001,579 B2 | 8/2011 | Olson et al. |

(56) References Cited

U.S. PATENT DOCUMENTS

| | | | |
|---|---|---|---|
| 8,179,814 B2 | 5/2012 | Shafer et al. | |
| 8,181,208 B1* | 5/2012 | Elwardani | H04N 7/106 |
| | | | 725/144 |
| 8,213,457 B2 | 7/2012 | Kelma et al. | |
| 8,286,209 B2* | 10/2012 | Egan, Jr. | H04N 7/104 |
| | | | 725/74 |
| 8,356,322 B2* | 1/2013 | Wells | H04N 7/104 |
| | | | 725/127 |
| 8,429,695 B2* | 4/2013 | Halik | H04L 12/2801 |
| | | | 725/127 |
| 8,510,782 B2* | 8/2013 | Wells | H04N 7/17309 |
| | | | 725/78 |
| 8,752,114 B1 | 6/2014 | Shapson et al. | |
| 9,167,286 B2 | 10/2015 | Wells et al. | |
| 9,351,051 B2* | 5/2016 | Wells | H04N 7/104 |
| 9,516,376 B2 | 12/2016 | Wells et al. | |
| 9,781,472 B2* | 10/2017 | Wells | H04N 21/6118 |
| 10,142,677 B2* | 11/2018 | Wells | H04N 21/6168 |
| 10,154,302 B2* | 12/2018 | Wells | H04N 7/104 |
| 10,341,719 B2* | 7/2019 | Wells | H04N 7/104 |
| 10,419,813 B2* | 9/2019 | Wells | H04N 21/43615 |
| 10,917,685 B2* | 2/2021 | Wells | H04N 21/63 |
| 11,528,526 B2* | 12/2022 | Wells | H04N 7/104 |
| 2001/0016950 A1 | 8/2001 | Matsuura | |
| 2002/0069417 A1 | 6/2002 | Kliger et al. | |
| 2002/0141347 A1 | 10/2002 | Harp et al. | |
| 2002/0141494 A1 | 10/2002 | Chappell | |
| 2002/0144292 A1 | 10/2002 | Uemura et al. | |
| 2002/0166124 A1 | 11/2002 | Gurantz et al. | |
| 2002/0174423 A1 | 11/2002 | Fifield et al. | |
| 2002/0174435 A1 | 11/2002 | Weinstein et al. | |
| 2003/0005450 A1 | 1/2003 | Smith | |
| 2003/0084458 A1 | 5/2003 | Ljungdahl et al. | |
| 2004/0076192 A1 | 4/2004 | Zerbe et al. | |
| 2004/0147273 A1 | 7/2004 | Morphy | |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0047051 A1 | 3/2005 | Marland | |
| 2005/0144649 A1 | 6/2005 | Bertonis et al. | |
| 2005/0155082 A1 | 7/2005 | Weinstein et al. | |
| 2005/0183130 A1 | 8/2005 | Sadja et al. | |
| 2005/0210977 A1 | 9/2005 | Yan | |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0041918 A9 | 2/2006 | Currivan et al. | |
| 2006/0117371 A1 | 6/2006 | Margulis | |
| 2006/0148406 A1 | 7/2006 | Strater et al. | |
| 2006/0191359 A1 | 8/2006 | Tarasinski et al. | |
| 2006/0205442 A1 | 9/2006 | Phillips et al. | |
| 2006/0241838 A1 | 10/2006 | Mongiardo et al. | |
| 2006/0282871 A1 | 12/2006 | Yo | |
| 2007/0024393 A1 | 2/2007 | Forse et al. | |
| 2007/0288981 A1 | 12/2007 | Mitsuse et al. | |
| 2007/0288982 A1 | 12/2007 | Donahue | |
| 2008/0001645 A1 | 1/2008 | Kuroki | |
| 2008/0013612 A1 | 1/2008 | Miller et al. | |
| 2008/0022344 A1 | 1/2008 | Riggsby | |
| 2008/0040764 A1 | 2/2008 | Weinstein et al. | |
| 2008/0075012 A1 | 3/2008 | Zielinski et al. | |
| 2008/0120667 A1 | 5/2008 | Zaltsman | |
| 2008/0127287 A1 | 5/2008 | Alkan et al. | |
| 2008/0157898 A1 | 7/2008 | Palinkas et al. | |
| 2008/0168518 A1 | 7/2008 | Hsue et al. | |
| 2008/0225902 A1 | 9/2008 | Chung | |
| 2008/0247401 A1 | 10/2008 | Bhal et al. | |
| 2008/0247541 A1 | 10/2008 | Cholas et al. | |
| 2008/0271094 A1 | 10/2008 | Kliger et al. | |
| 2008/0313691 A1 | 12/2008 | Cholas et al. | |
| 2009/0031391 A1 | 1/2009 | Urbanek | |
| 2009/0047917 A1 | 2/2009 | Phillips et al. | |
| 2009/0077608 A1 | 3/2009 | Romerein et al. | |
| 2009/0153263 A1 | 6/2009 | Lin | |
| 2009/0154369 A1 | 6/2009 | Helvig et al. |
| 2009/0165070 A1 | 6/2009 | McMullin et al. |
| 2009/0180782 A1 | 7/2009 | Bernard et al. |
| 2009/0217325 A1 | 8/2009 | Kliger et al. |
| 2009/0316608 A1 | 12/2009 | Singh et al. |
| 2009/0320085 A1 | 12/2009 | Wang |
| 2009/0320086 A1 | 12/2009 | Rijssemus et al. |
| 2010/0017842 A1 | 1/2010 | Wells |
| 2010/0095344 A1 | 4/2010 | Newby |
| 2010/0100912 A1 | 4/2010 | Olson et al. |
| 2010/0100918 A1 | 4/2010 | Egan, Jr. et al. |
| 2010/0100921 A1 | 4/2010 | Olson et al. |
| 2010/0125877 A1 | 5/2010 | Wells et al. |
| 2010/0146564 A1 | 6/2010 | Halik et al. |
| 2010/0162340 A1 | 6/2010 | Riggsby |
| 2010/0194489 A1 | 8/2010 | Kearns et al. |
| 2010/0225813 A1 | 9/2010 | Hirono et al. |
| 2010/0266000 A1 | 10/2010 | Froimovich et al. |
| 2011/0002245 A1 | 1/2011 | Wall et al. |
| 2011/0010749 A1 | 1/2011 | Alkan |
| 2011/0051014 A1 | 3/2011 | Wang et al. |
| 2011/0069740 A1 | 3/2011 | Cowley et al. |
| 2011/0072472 A1 | 3/2011 | Wells et al. |
| 2011/0085452 A1 | 4/2011 | Kelma et al. |
| 2011/0085480 A1 | 4/2011 | Kelma et al. |
| 2011/0085586 A1 | 4/2011 | Kelma et al. |
| 2011/0088077 A1 | 4/2011 | Kelma et al. |
| 2011/0181371 A1 | 7/2011 | Alkan et al. |
| 2011/0258677 A1 | 10/2011 | Shafer |
| 2012/0054805 A1 | 3/2012 | Shafer et al. |
| 2012/0054819 A1 | 3/2012 | Alkan et al. |
| 2012/0081190 A1 | 4/2012 | Rijssemus |
| 2012/0159556 A1 | 6/2012 | Alkan |
| 2012/0331501 A1 | 12/2012 | Shafer |
| 2013/0002958 A1 | 1/2013 | Labro |
| 2013/0081096 A1 | 3/2013 | Wells et al. |
| 2013/0181789 A1 | 7/2013 | Rijssemus |
| 2013/0227632 A1 | 8/2013 | Wells et al. |
| 2013/0283334 A1 | 10/2013 | Tsao et al. |
| 2015/0303891 A1 | 10/2015 | Muterspaugh et al. |
| 2015/0304732 A1 | 10/2015 | Shapson et al. |
| 2018/0007318 A1 | 1/2018 | Bailey et al. |
| 2018/0097540 A1 | 4/2018 | Uejima |
| 2018/0205910 A1 | 7/2018 | Li et al. |
| 2018/0288491 A1 | 10/2018 | Shapson et al. |
| 2019/0074904 A1 | 3/2019 | Lin |

FOREIGN PATENT DOCUMENTS

| | | |
|---|---|---|
| CN | 101369818 A | 2/2009 |
| CN | 101374285 A | 2/2009 |
| CN | 102164255 A | 8/2011 |
| EP | 2536137 A1 | 12/2012 |
| JP | 55-080989 A | 6/1980 |
| JP | 55-132126 A | 10/1980 |
| JP | 57-091055 A | 6/1982 |
| JP | 58-101582 A | 6/1983 |
| JP | 58-99913 A | 7/1983 |
| JP | 59-026709 Y2 | 8/1984 |
| JP | 61-157035 A | 7/1986 |
| JP | 05-191416 A | 7/1993 |
| JP | 07-038580 A | 2/1995 |
| JP | 11-069334 A | 3/1999 |
| JP | 2001-177580 A | 6/2001 |
| JP | 2004-080483 A | 3/2004 |
| JP | 2005-005875 A | 1/2005 |
| JP | 2007-166109 A | 6/2007 |
| JP | 2007-166110 A | 6/2007 |
| WO | 00/24124 A1 | 4/2000 |
| WO | 01/72005 A1 | 9/2001 |
| WO | 02/33969 A1 | 4/2002 |
| WO | 02/091676 A1 | 11/2002 |

OTHER PUBLICATIONS

Author Unknown, Office Action dated Jul. 31, 2014, Chinese Application No. 201110037086.1, filed Jan. 21, 2011, pp. 1-6.

(56) References Cited

OTHER PUBLICATIONS

Gallo, A., "Basics of RF Electronics", CERN Yellow Report CERN-2011-007, Dec. 14, 2011, pp. 223-275.
Office Action Summary dated Nov. 22, 2011, U.S. Appl. No. 12/255,008, filed Oct. 21, 2008, pp. 1-22.
Final Office Action dated Jan. 30, 2019, U.S. Appl. No. 15/891,441, filed Feb. 8, 2018, pp. 1-24.
First Action Interview Office Action dated Sep. 21, 2018, U.S. Appl. No. 15/880,166, filed Jan. 25, 2018, pp. 1-14.
First Action Interview Office Action dated Aug. 10, 2018, U.S. Appl. No. 15/890,573, filed Feb. 7, 2018, pp. 1-15.
First Action Interview Office Action dated Aug. 10, 2018, U.S. Appl. No. 15/891,441, filed Feb. 8, 2018, pp. 1-15.
Non-Final Office Action dated May 18, 2018, U.S. Appl. No. 15/722,302, pp. 1-34.
Notice of Allowance dated May 8, 2019, U.S. Appl. No. 15/880,231, filed Jan. 25, 2018, pp. 1-12.
Notice of Allowance dated Oct. 17, 2018, U.S. Appl. No. 15/890,573, filed Feb. 7, 2018, pp. 1-20.
Notice of Allowance dated Oct. 18, 2018, U.S. Appl. No. 15/880,166, filed Jan. 25, 2018, pp. 1-38.
Notice of Allowance dated Oct. 18, 2018, U.S. Appl. No. 15/886,788, filed Feb. 1, 2018, pp. 1-30.
Notice of Allowance dated Sep. 28, 2018, U.S. Appl. No. 15/880,363, filed Jan. 25, 2018, pp. 1-70.
Pre-Interview First Office Action dated Jun. 8, 2018, U.S. Appl. No. 15/890,573, pp. 1-24.
Pre-Interview First Office Action dated Jun. 18, 2018, U.S. Appl. No. 15/891,441, pp. 1-24.
Pre-Interview First Office Action dated Aug. 15, 2018, U.S. Appl. No. 15/886,800, filed Feb. 1, 2018, pp. 1-30.
Pre-Interview First Office Action dated Jul. 16, 2018, U.S. Appl. No. 15/880,166, filed Jan. 25, 2018, pp. 1-10.
Pre-Interview First Office Action dated Aug. 3, 2018, U.S. Appl. No. 15/880,363, filed Jan. 25, 2018, pp. 1-30.
Pre-Interview First Office Action dated Aug. 10, 2018, U.S. Appl. No. 15/886,788, filed Feb. 1, 2018, pp. 1-30.
Non-Final Office Action dated Feb. 26, 2016, U.S. Appl. No. 14/881,686, pp. 1-6.
Office Action Summary dated Mar. 6, 2012, U.S. Appl. No. 12/563,719, filed Sep. 21, 2009, pp. 1-13.
First Office Action dated Jun. 1, 2021, Chinese Application No. 201980006075.1, pp. 1-14 (including English translation).
Shane Thomas (Authorized Officer), International Search Report and Written Opinion dated Nov. 2, 2017, PCT Application No. PCT/US2017/040260, pp. 1-18.
Sung Lark Kwon (Authorized Officer), International Search Report dated May 31, 2011, PCT Application No. PCT/US2010/049568, filed Sep. 21, 2010, pp. 1-3.

\* cited by examiner

ENTRY DEVICE FOR COMMUNICATING EXTERNAL NETWORK SIGNALS AND IN-HOME NETWORK SIGNALS

CROSS REFERENCE TO RELATED APPLICATIONS

This application is a continuation U.S. patent application Ser. No. 17/159,919, filed Jan. 27, 2021, which is a continuation U.S. patent application Ser. No. 16/564,949, filed Sep. 9, 2019, which is a continuation of U.S. patent application Ser. No. 15/880,231, filed Jan. 25, 2018, which is a continuation of U.S. patent application Ser. No. 15/722,302, filed Oct. 2, 2017, now U.S. Pat. No. 10,154,302, which is a continuation of U.S. patent application Ser. No. 15/133,948, filed Apr. 20, 2016, now U.S. Pat. No. 9,781,472, which is a continuation of U.S. patent application Ser. No. 13/863,693, filed Apr. 16, 2013, now U.S. Pat. No. 9,351,051, which is a continuation-in-part of U.S. patent application Ser. No. 12/704,833, filed Feb. 12, 2010, now issued as U.S. Pat. No. 8,429,695, and a continuation-in part of U.S. patent application Ser. No. 12/255,008, filed Oct. 21, 2008, now issued as U.S. Pat. No. 8,286,209. U.S. patent application Ser. No. 13/863,693, now U.S. Pat. No. 9,351,051, is also a continuation-in-part of U.S. patent application Ser. No. 13/688,420, filed Nov. 29, 2012, now issued as U.S. Pat. No. 9,167,286, which is a continuation of U.S. patent application Ser. No. 12/563,719, filed Sep. 21, 2009, now U.S. Pat. No. 8,356,322. Each of these applications is incorporated by reference herein in its entirety.

FIELD OF THE INVENTION

This invention relates to community access television or cable television (CATS') networks and to in-home entertainment (IHE) networks. More particularly, the present invention relates to a new and improved CATV entry adapter which conducts active CATV signals to active ports, conducts passive CATV signals to passive ports, and which maintains the privacy of IHE data at the premises of one CATV subscriber or customer and prevents the IHE data from one subscriber from reaching the premises of another CATV subscriber and/or interfering with the IHE network functionality at the other premises, among other improvements.

BACKGROUND OF THE INVENTION

CATV networks use an infrastructure of interconnected coaxial cables, signal splitters and combiners, repeating amplifiers, filters, trunk lines, cable taps, drop lines and other signal-conducting devices to supply and distribute high frequency CATV "downstream" signals from a main signal distribution facility, known as a "headend," to the premises (homes and offices) of CATV subscribers. The CATV downstream signals operate the subscriber equipment, such as television sets, telephone sets and computers. In addition, most CATV networks also transmit CATV "upstream" signals from the subscriber equipment back to the headend of the CATV network. For example, the subscriber uses a set top box to select programs for display on the television set. As another example, two-way communication is essential when using a personal computer connected through the CATV infrastructure to the public Internet. As a further example, Voice Over Internet Protocol (VOIP) telephone sets use the CATV infrastructure and the public Internet as the communication medium for two-way telephone conversations.

To permit simultaneous communication of CATV upstream and downstream signals, and to permit interoperability of the subscriber equipment and the equipment associated with the CATV network infrastructure outside of subscriber premises, the CATV downstream and the CATV upstream signals are confined to two different frequency ranges. The CATV downstream signal frequency range is within the range of 54-1002 megahertz (MHz) and the CATV upstream signal frequency range is within the range of 5-42 MHz, in most CATV networks.

The CATV downstream signals are delivered from the CATV network infrastructure to the subscriber premises at a CATV entry adapter, which is also commonly referred to as an entry device, terminal adapter or a drop amplifier. The entry adapter is a multi-port device which connects at an entry port to a CATV drop cable from the CATV network infrastructure and which connects at a multiplicity of other distribution ports to coaxial cables which extend throughout the subscriber premises to cable outlets. Each cable outlet is available to be connected to subscriber equipment. Typically, most homes have coaxial cables extending to cable outlets in almost every room, because different types of subscriber equipment may be used in different rooms. For example, television sets, computers and telephone sets are commonly used in many different rooms of a home or office. The multiple distribution ports of the entry adapter deliver the downstream signals to each cable outlet and conduct the upstream signals from the subscriber equipment through the entry adapter to the drop cable of the CATV infrastructure.

In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. As a further example, signals from a receiver of satellite-broadcast signals may be distributed for viewing or listening throughout the home. These types of devices, including the more-conventional television sets, telephone sets and devices connected to the Internet by the CATV network, are generically referred to as multimedia devices.

The desire to use multimedia devices at multiple different locations within the home or subscriber premises has led to the creation of In-Home Entertainment (IHE) networks, which distribute multiple streams of In-Home Entertainment signals to the multimedia devices within the subscriber premises. Examples of home networking technologies that can be used to create In-Home Entertainment networks include Ethernet, HomePlug, HPNA, and 802.11n. In another example, the user data network may employ technology standards developed by the Multimedia over Coax Alliance. The Multimedia over Coax Alliance (MoCA) has developed specifications for products to create an In-Home Entertainment (IHE) network for interconnecting presently-known and future multimedia devices.

An IHE network uses the subscriber premise or in-home coaxial cable infrastructure originally established for distribution of CATV signals within the subscriber premises, principally because that coaxial cable infrastructure already exists in most homes and is capable of carrying much more information than is carried in the CATV frequency ranges. An IHE network is established by connecting IHE-enabled devices or IHE interface devices at the cable outlets in the rooms of the subscriber premises. The IHE devices and the IHE interface devices implement an IKE communication protocol which encapsulates the signals normally used by the multimedia devices within IHE signal packets and then communicates the signal packets between other IHE interface devices connected at other cable outlets. The receiving IHE interface device removes the encapsulated multimedia signals from the IHE signal packets, and delivers the multimedia signals to the connected display, computer or other multimedia device from which the content is presented to the user.

Each IHE-enabled device is capable of communicating with every other IHE-enabled device in the in-home or subscriber premises network to deliver the multimedia content throughout the home or subscriber premises. The multimedia content that is available from one multimedia device can be displayed, played or otherwise used on a different IHE-enabled device at a different location within the home, thereby avoiding physically relocating the originating multimedia device from one location to another within the subscriber premises. The communication of multimedia content over the ME network is considered beneficial in more fully utilizing the multimedia devices present in modern homes.

Since the operation of the subscriber premises IHE network must occur simultaneously with the operation of the CATV services, the IHE signals utilize a frequency range different from the frequency ranges of the CATV upstream and CATV downstream signals. A typical IHE signal frequency range is 1125-1675 megahertz (MHz).

In addition to traditional cable television service, a telephone service, known as "lifeline telephone service," is also available to many CATV subscribers. Lifeline telephone service remains operative in emergency situations, even during a loss of power to the subscriber premises. An embedded multimedia terminal adapter (eMTA) device which includes a cable modem and a telephone adapter is used to receive the telephone service. The telephone service is typically implemented using a voice over Internet protocol (VOIP) communicated by the CATV upstream and downstream signals. Since the telephone service is expected to be available during a loss of power to the subscriber premises, CATV entry adapters adapted for use with an eMTA device have a passive port to which passive CATV upstream and downstream signals are conducted without amplification or other conditioning by an active electronic component. As a consequence, the loss of power at the subscriber premises does not adversely affect the communication of passive CATV signals to and from the passive port.

In addition to the passive port, CATV entry adapters typically have an active signal communication path which amplifies the CATV downstream signals and conducts them to a plurality of active ports of the CATV entry adapter. Subscriber equipment connected to the active ports typically benefits from the amplification of the CATV downstream signals. However, the loss of power to the entry adapter adversely influences the active signals conducted to and from the active ports through power-consuming components which become inoperative when power is lost. The communication of active CATV signals under power loss conditions is severely compromised or impossible.

Most eMTA devices used for passive CATV signal communication are not presently IHE-enabled. However, IHE-enabled eMTA devices are recognized as useful for expanding the number of multimedia devices in the IHE network. For example, telephony multimedia devices such as auxiliary telephone sets and answering machines could interact with an IHE-enabled eMTA device and provide telephony services throughout the subscriber premises. In order for multimedia devices to communicate with the IHE-enabled eMTA device, the CATV entry adapter must be capable of communicating IHE signals between the passive and active ports.

A disadvantage of implementing the IHE network with the in-home coaxial cable system is that the IHE frequencies have the capability of passing through the CATV entry device and entering the CATV network, where they may then pass through a cable drop and enter an adjoining subscriber's premises.

The presence of the IHE signals at an adjoining subscriber's premises compromises the privacy and security of the information originally intended to be confined only within the original subscriber premises. The IHE signals from the original subscriber premises, which enter through the CATV network to an adjoining subscriber premises, also have the potential to adversely affect the performance of an IHE network in the adjoining subscriber premises. The conflict of the signals from the original and adjoining subscriber premises may cause the IHE interface devices to malfunction or not operate properly on a consistent basis.

CATV networks are subject to adverse influences from so-called ingress noise which enters the CATV network from external sources, many of which are located at the subscriber premises. The typical range of ingress noise is in the frequency range of 0-15 MHz, but can also exist in other upstream or downstream frequencies. Ingress noise mitigation devices have been developed to suppress or reduce ingress noise from the subscriber premises before it enters the CATV network. The IHE frequency range is considerably outside the range of the normal ingress noise, and ingress noise suppression devices are ineffectual in inhibiting IHE signals. IHE signals, being outside of the CATV signal frequency range, may also constitute another source of noise for the CATV network. Separate IHE frequency rejection filters have been developed for external connection to CATV entry adapters. However, the use of such devices is subject to unauthorized removal, tampering, forgetfulness in original installation, and physical exposure which could lead to premature failure or malfunction.

Problems also arise because the CATV network and the in-home cable infrastructure were originally intended for the distribution of CATV signals to the cable outlets. The typical in-home cable infrastructure uses signal splitters to divide a single CATV downstream signal into multiple CATV downstream signals and to combine multiple CATV upstream signals into a single CATV upstream signal or range of signals. Distribution of the CATV signals to and from the cable outlets occurs in this manner. The CATV cable infrastructure was not intended for communication between cable outlets. But to implement the IHE communication protocol, the IHE signals must traverse between the multiple cable outlets by communication through each splitter in a traversal process referred to as "splitter jumping."

The typical signal splitter has a high degree of signal rejection or isolation between its multiple output ports (the signal splitter output ports are also referred to as signal component legs). When the IHE signals jump the output ports of a splitter, the degree of signal rejection or isolation greatly diminishes the strength of the signals which effectively jump the output ports. The physical signal communication paths between the cable outlets are also highly variable because of the differences in the in-home cable infrastructure in most homes. The IHE communication protocol recognizes the possibility of variable strength signals, and provides a facility to boost the strength of IHE signals under certain circumstances. However, the substantial differences in the in-home cable infrastructure may nevertheless negatively impact the strength of the IHE signals conducted.

One example of significant negative impact on IHE signals arises from passive-active CATV entry adapters. Passive-active CATV entry adapters supply both passive CATV signals and amplified or active CATV signals at the subscriber premises for delivery to passive and active types of CATV subscriber equipment, respectively. Passive-active entry adapters include a splitter which essentially divides or branches the downstream signals from the CATV network into passive signals and into active signals. The passive signals are conducted through the entry adapter without amplification, conditioning or modification before they are delivered from a passive port to passive subscriber equipment, often the voice modem of a "life-line" telephone set. Because life-line telephone services are intended to remain useful in emergency conditions, the functionality of the telephone set cannot depend on the proper functionality of an amplifier or other active signal conditioner in the signal path. The active signals are conducted through a forward path amplifier, where the amplifier amplifies the strength of the signals or modifies or conditions some characteristic of the signals before delivery from active ports to active subscriber equipment. Because most subscriber equipment benefits from amplified signals, the majority of ports on a CATV entry adapter are active ports. Usually only one passive port is provided for each entry adapter.

In those situations where a CATV subscriber does not utilize the passive port for passive equipment, active equipment may be connected to the passive port and that active equipment may function properly if the strength of the signal from the passive port is sufficient. In other cases, the passive port simply may not be connected, and only the active ports of the CATV entry adapter are used.

Often attempts to connect the passive port as part of an IHE network will not be successful, however, because the IHE signals are severely diminished in signal strength when they pass from the active ports in a reverse direction through the forward path amplifier. The IHE signals must pass in a reverse direction through the forward path amplifier to reach the splitter of the CATV entry adapter before the IHE signals can jump the splitter and reach the passive port. Signal conductivity in the reverse direction through a forward path amplifier is simply not possible without severe attenuation. Thus, it has been difficult to use a passive port on a CATV entry adapter for connection in an IHE network, because of inadequate IHE signal strength. The level of attenuation is greater than can be overcome by adjusting the boost of the IHE signals in accordance with the IHE communication protocol.

SUMMARY OF THE INVENTION

Embodiments of the disclosure include an entry device for communicating external network signals between an in-home network and an external network, for communicating in-home network signals within the in-home network, and for preventing the in-home network signals from being communicated from the in-home network to the external network. The entry device includes an entry port configured to communicate the external network signals with the external network, a first network port configured to be coupled to a server network interface of the in-home network, a plurality of second network ports each configured to be coupled to a client network interface of the in-home network, and a first splitter electrically connected the entry port having a first leg and a second leg. The first network port is electrically connected to the first leg. The entry device also includes an in-home network signal blocking device that is upstream of the first splitter and downstream of the entry port. The in-home network rejection device is configured to permit the external network signals to pass therethrough depending on the external network signals being in a first frequency band, and to block the in-home network signals from passing therethrough depending on the in-home network signals being in a second frequency band that is different from the first frequency band. The entry device further includes a second splitter electrically connected to the second leg of the first splitter, and having a plurality of output legs each being electrically connected to respective second network ports of the plurality of second network ports. The second splitter is configured to provide bidirectional communication of the in-home network signals among the plurality of second network ports. The entry device includes a signal attenuation and communication device including one or more directional couplers. The signal attenuation and communication device is configured to permit the external network signals to communicate between the entry port and the first network work, and between the entry port and the second network ports, at least partially depending on the external network signals being in the first frequency band. The signal attenuation and communication device is also configured to block and permit communication of the in-home network signals between the first network port, the second network port, and the entry port at least partially depending on a direction in which the in-home network signals are travelling and at least partially depending on the in-home network signals being in the second frequency band and not in the first frequency band, such that the signal attenuation and communication device is configured to block at least some of the in-home network signals from reaching the entry port, and permit the in-home network signals to communicate between the first and second network ports. The first frequency band is 5-1002 MHz, and wherein the second frequency band is 1125-1675 MHz.

Embodiments of the disclosure also include an entry device for communicating external network signals between an in-home network and an external network, for communicating in-home network signals within the in-home network, and for preventing the in-home network signals from being communicated from the in-home network to the external network. The entry device includes an entry port configured to communicate the external network signals with the external network, a first network port configured to be coupled to a server network interface of the in-home network, a plurality of second network ports each configured to be coupled to a client network interface of the in-home network, a first splitter electrically connected the entry port and having a first leg and a second leg, wherein the first network port is electrically connected with the first leg, and a signal attenuation and communication device comprising one or more directional couplers. The signal attenuation and communication device is configured to permit upstream and downstream external network signals to communicate between the entry port and the first network work, and between the entry port and the second network ports, and block and permit communication of in-home network signals between the first network port, the second network port, and the entry port at least partially depending on a direction in which the in-home network signals are travelling, so as to block the in-home network signals from reaching the entry port, and permit the in-home network signals to communicate between the first and second network ports.

Embodiments of the disclosure further include an entry device for communicating external network signals between an in-home network and an external network, for communicating in-home network signals within the in-home network, and for preventing the in-home network signals from being communicated from the in-home network to the external network. The entry device includes a signal attenuation and communication device having one or more directional couplers. The signal attenuation and communication device is configured to permit upstream and downstream external network signals to communicate between an entry port and a first network port, and between the entry port and a second network port, and block and permit communication of in-home network signals between the first network port, the second network port, and the entry port at least partially depending on a direction in which the in-home network signals are travelling, so as to block the in-home network signals from reaching the entry port, and permit the in-home network signals to communicate between the first and second network ports.

DETAILED DESCRIPTION OF EMBODIMENTS
OF THE INVENTION

Figure 1:
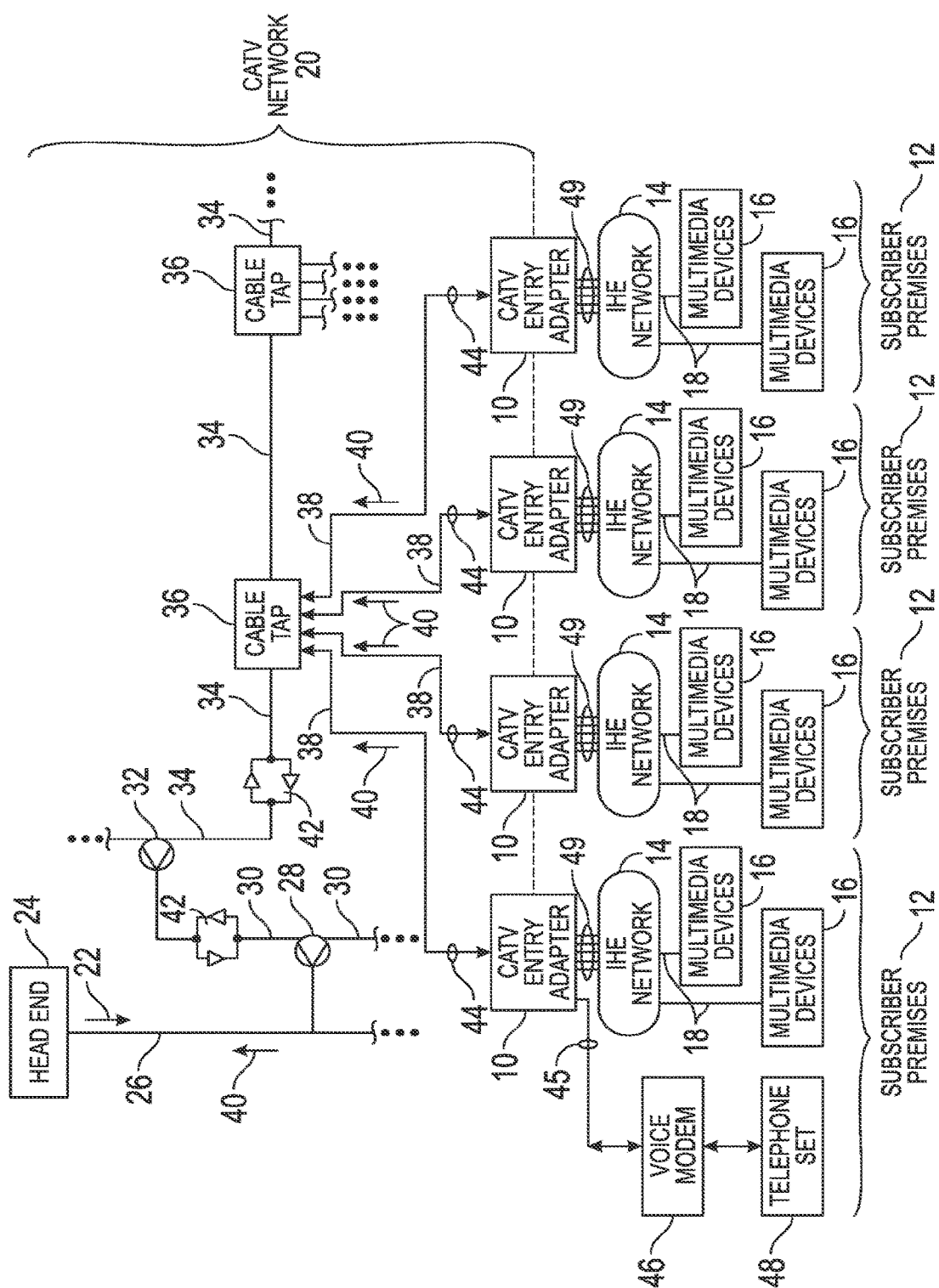
FIG. 1 is a block diagram illustrating a plurality of CATV entry adapters 10 according to the invention, shown interconnecting CATV network 20 and a plurality of IHE networks 14, each located at subscriber premises 12.

One embodiment of a plurality of CATV entry adapters 10 according to the invention is shown in FIG. 1. Each CATV entry adapter 10 is located at a subscriber premises 12 and forms a part of an In-Home Entertainment (IHE) network 14. Multimedia devices 16 are connected to each IHE network 14 in each subscriber premises 12. Each multimedia device 16 communicates multimedia content, or IHE signals, between itself and other ME multimedia devices using IHE network 14, which is formed in part by the preexisting coaxial cable infrastructure (represented generally by coaxial cables 18) present in subscriber premises 12. Examples of multimedia devices 16 are digital video recorders, computers, data modems, computer game playing devices, television sets, television set-top boxes, and other audio and visual entertainment devices. Often, but not by way of limitation, the multimedia devices 16 constitute active subscriber equipment.

CATV entry adapter 10 is also a part of conventional CATV network 20. Each CATV entry adapter 10 delivers CATV content or signals from CATV network 20 to subscriber equipment at the subscriber premises 12. The subscriber equipment includes the multimedia devices 16, but may also include other devices which do not operate as a part of the IHE network 14 but which are intended to function as a result of connection to CATV network 20. Examples of subscriber equipment which are normally not part of the IHE network 14 are voice modems 46 and connected telephone sets 48. In general, subscriber equipment includes any equipment located at a subscriber premises 12 that is coupled to the passive or active entry ports of entry adapter 10.

CATV entry adapter 10 has beneficial characteristics which allow it to function in multiple roles simultaneously in both IHE network 14 and in CATV network 20, thereby benefiting both the IHE network 14 and the CATV network 20. CATV entry adapter 10 functions as a hub in IHE network 14, to effectively transfer IRE signals between multimedia devices 16, including those that might be connected to passive ports of the CATV entry adapter 10, as will be described in greater detail below. CATV entry adapter 10 also functions in a conventional role as an interface between CATV network 20 and the subscriber equipment located at the subscriber premises 12, thereby facilitating CATV service to the subscriber. In addition, CATV entry adapter 10 securely and privately confines IHE network communications within each subscriber premise 12 and prevents the IHE signals from entering CATV network 20 and degrading the strength of CATV signals conducted by CATV network 20. These and other improvements and functions are described in greater detail below.

CATV network 20 shown in FIG. 1 has a typical topology. Downstream signals 22 originate from programming sources at headend 24 of CATV network 20, and are conducted to CATV entry adapter 10 in a sequential path through main trunk cable 26, signal splitter/combiner 28, secondary trunk cables 30, another signal splitter/combiner 32, distribution cable branches 34, cable taps 36, and drop cables 38. Upstream signals 40 are delivered from CATV entry adapter 10 to CATV network 20, and are conducted to headend 24 in a reverse sequential path. Interspersed at appropriate locations within the topology of CATV network 20 are conventional repeater amplifiers 42, which amplify both the downstream signals 22 and the upstream signals 40. Conventional repeater amplifiers may also be included in cable taps 36. Cable taps 36 and signal splitter/combiners 28 and 32 divide a single downstream signal 22 into multiple separate downstream signals, and combine multiple upstream signals 40 into a single upstream signal.

CATV entry adapter 10 receives downstream signals 22 from CATV network 20 at a CATV network entry or connection port 44. CATV downstream signals 22 are either passive or active. Passive CATV downstream signals are those signals which are conducted through CATV entry adapter 10 without amplification, enhancement, modification or other substantial conditioning. Passive CATV downstream signals 78 (FIG. 3) are delivered from passive port 45 to passive subscriber equipment, such as voice modem 46 connected to telephone set 48 (shown connected to only one CATV entry adapter 10 in FIG. 1). Active CATV downstream signals are those signals which are amplified, filtered, modified, enhanced or otherwise conditioned by power-consuming active electronic circuit components within CATV entry adapter 10, such as an amplifier for example. The conditioned active CATV downstream signals 80 (FIG. 3) are divided into multiple copies and delivered from a plurality of active ports (collectively referenced at 49 in FIG. 1, but individually referenced at 50, 52, 54 and 56 in FIG. 2 and FIG. 3) to subscriber equipment located at subscriber premises 12.

CATV subscriber equipment typically generates CATV upstream signals and delivers them to CATV entry adapter 10 for delivery- to CATV network 20. The CATV upstream signals 40 may be passive CATV upstream signals 82 (see FIG. 3) generated by passive subscriber equipment, exemplified by voice modem 46 and the telephone set 48, or the CATV upstream signals 40 may be active CATV upstream signals 96 (See FIG. 3) generated by active subscriber equipment exemplified by set-top boxes connected to television sets (neither shown). Set top boxes allow the subscriber/viewer to make programming and viewing selections.

Figure 2:
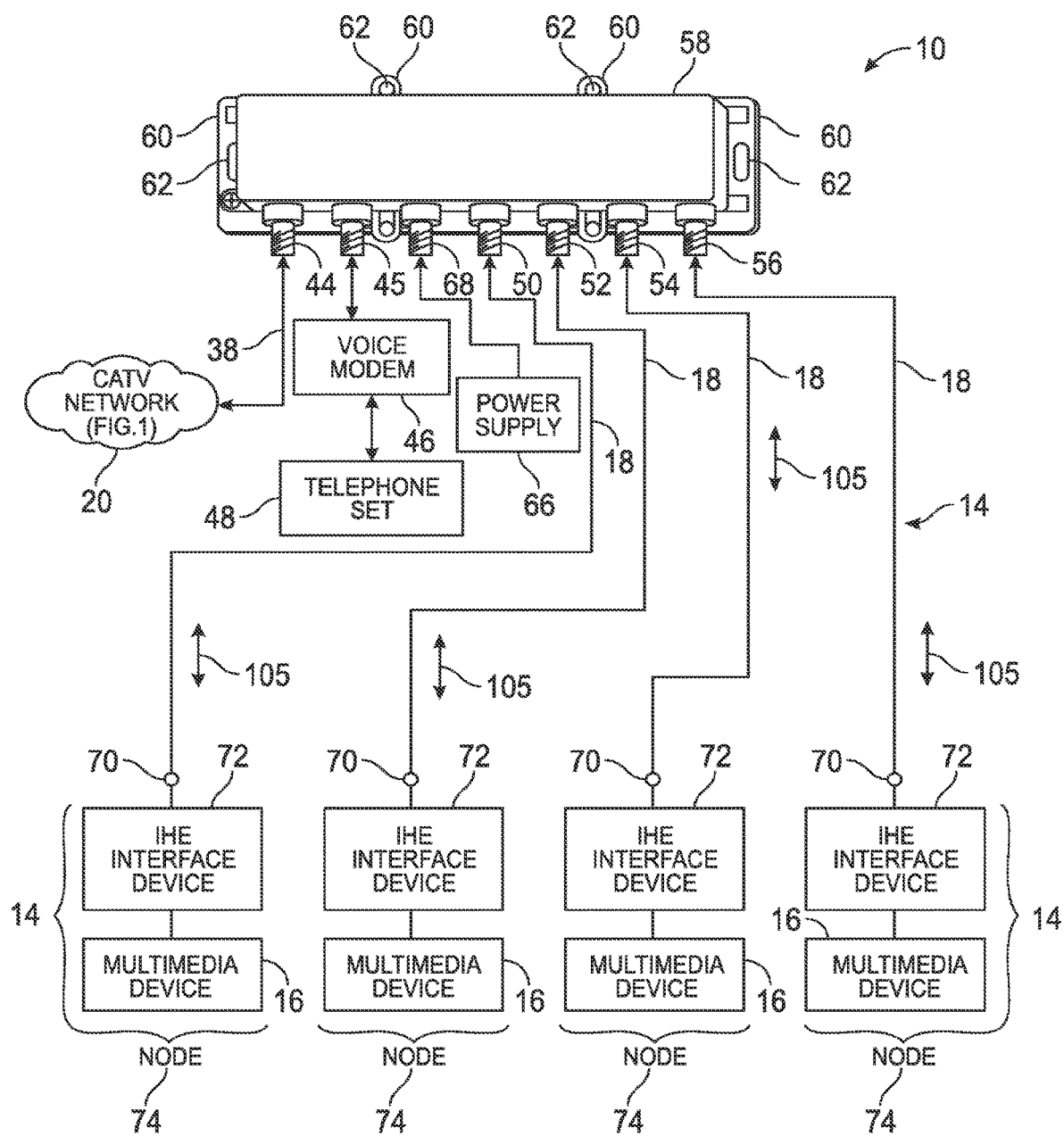
FIG. 2 is a generalized perspective view of one embodiment of CATV entry adapter 10 of FIG. 1, connected to IHE network 14 in one subscriber premises 12, with more details of IHE network 14 and active and passive subscriber equipment 16 connected to CATV entry adapter 10 shown in block diagram form, and also showing components forming nodes of IHE network 14.

More details concerning one embodiment of CATV entry device 10 are shown in FIG. 2. CATV entry adapter 10 includes housing 58 which encloses internal electronic circuit components (shown in FIGS. 3 and 4). A mounting flange 60 surrounds housing 58 and holes 62 in flange 60 allow attachment of CATV entry adapter 10 to a support structure at subscriber premises 12. Electrical power for CATV entry adapter 10 is supplied from a conventional DC power supply 66 connected to a dedicated power input port 68. Alternatively, electrical power can be supplied through a conventional power inserter (not shown) that is connected to one of the active ports 50, 52, 54 or 56. The power inserter allows relatively low voltage DC power to be conducted through the same active port that also conducts high-frequency signals. Use of a conventional power inserter eliminates the need for a separate dedicated power supply port 68, or provides an alternative port through which electrical power can also be applied. The power supply 66 or the power supplied from the power inserter is typically derived from a conventional wall outlet (not shown) within the subscriber premises 12. CATV network 20 is connected to CATV network entry port 44 of CATV entry adapter 10.

The ports 44, 45, 50, 52, 54, 56 and 68 are each preferably formed by a conventional female coaxial cable connector which is mechanically connected to housing 58 and which is electrically connected to the internal components of CATV entry adapter 10. Coaxial cables 18 from subscriber premises 12 cable infrastructure and drop cables 38 (FIG. 1) are connected to CATV entry adapter 10 by mechanically connecting the corresponding mating male coaxial cable connector (not shown) on these coaxial cables to the female coaxial cable connectors forming the ports 44, 45, 50, 52, 54, 56 and 68.

Often one CATV entry adapter 10 is located at each subscriber premises 12. The number of active and passive ports 45, 50, 52, 54 and 56 is dictated by the number of coaxial cables 18 which are routed throughout the subscriber premises. Passive and active ports 45, 50, 52, 54 are used to each connect to at least one of the plurality of pieces of subscriber equipment at subscriber premises 12. Although the CATV entry adapter 10 shown in FIG. 2 includes seven ports, other entry adapters 10 according to the invention have a larger or smaller number of ports. The number and routing of the coaxial cables 18 within subscriber premises 12 constitute the in-home or subscriber premise cable infrastructure that is used by IHE network 14 (FIG. 1).

Since the CATV service provider supplies CATV entry adapter 10 for use by each subscriber, it is advantageous to reduce the number of different configurations of CATV entry adapters. Doing so offers economies of scale in mass production, reduces the opportunity for errors in installation, allows the subscriber to expand and change the in-home cable infrastructure, and reduces inventory costs, among other things.

CATV entry adapter 10 also functions as a hub in IHE network 14 (FIG. 1). With built-in hub capability as described below, and with the capability to use all of the available ports for connection to multimedia devices 16, CATV entry adapter 10 is more useful and economical to both the CATV service provider and the subscriber who wishes to implement an IHE network at his or her premises.

Each of coaxial cables 18 of the in-home cable infrastructure terminates at a cable outlet 70. Those coaxial cables 18 which are not currently in use are terminated with an appropriate termination resistor (not shown) located at cable outlet 70 of these coaxial cables 18. Cable outlet 70 of coaxial cables 18 being used by the subscriber are connected to either an IHE interface device 72 where a multimedia device 16 is connected, to a multimedia device 16 which is IHE-enabled, or to some other form of subscriber equipment.

Each IHE interface device 72 is a conventional item presently available for purchase and use. Although the IHE interface devices 72 are shown as separate from multimedia devices 16, in some embodiments each IHE interface device 72 is incorporated within or is an integral part of an IHE-enabled multimedia device 16. However, for those multimedia devices 16 which do not include a built-in IHE interface device 72, a separate IHE-enabled device 72 is connected to the multimedia device 16 to thereby allow it to participate as a node in IHE network 14.

Each IHE interface device 72 contains a controller which is programmed with the necessary functionality to implement the IHE communication protocol. Each IHE interface device 72 is connected between the cable outlet 70 and a multimedia device 16. When the multimedia device 16 creates output signals, those output signals are encapsulated or otherwise embodied in IHE signals 105 created by the IHE interface device 72, and then IHE signals 105 are communicated by one IHE interface device 72 through coaxial cables 18 of the in-home cable infrastructure, through CATV entry adapter 10, and to another IHE interface device 72. The other IHE-enabled device 16 or IHE interface device 72 that is receiving IHE signals 105 extracts the original output signals that were encapsulated or otherwise embodied in IHE signals 105. If the receiving device is IHE interface device 72, IHE interface device 72 supplies those original output signals to the multimedia device 16 to which the IHE interface device 72 is attached. In this manner, IHE signals or multimedia content 105 from one multimedia device 16 are/is communicated through IHE network 14 to another multimedia device 16 for use at its location. Functioning in this manner, and in terms of the conventional terminology used in the field of networks, the IHE interface device 72 and the multimedia device 16 form one node 74 of the IHE network 14. IHE signals 105 are therefore communicated between the different IHE nodes 74 of the IHE network 14.

Figure 3:
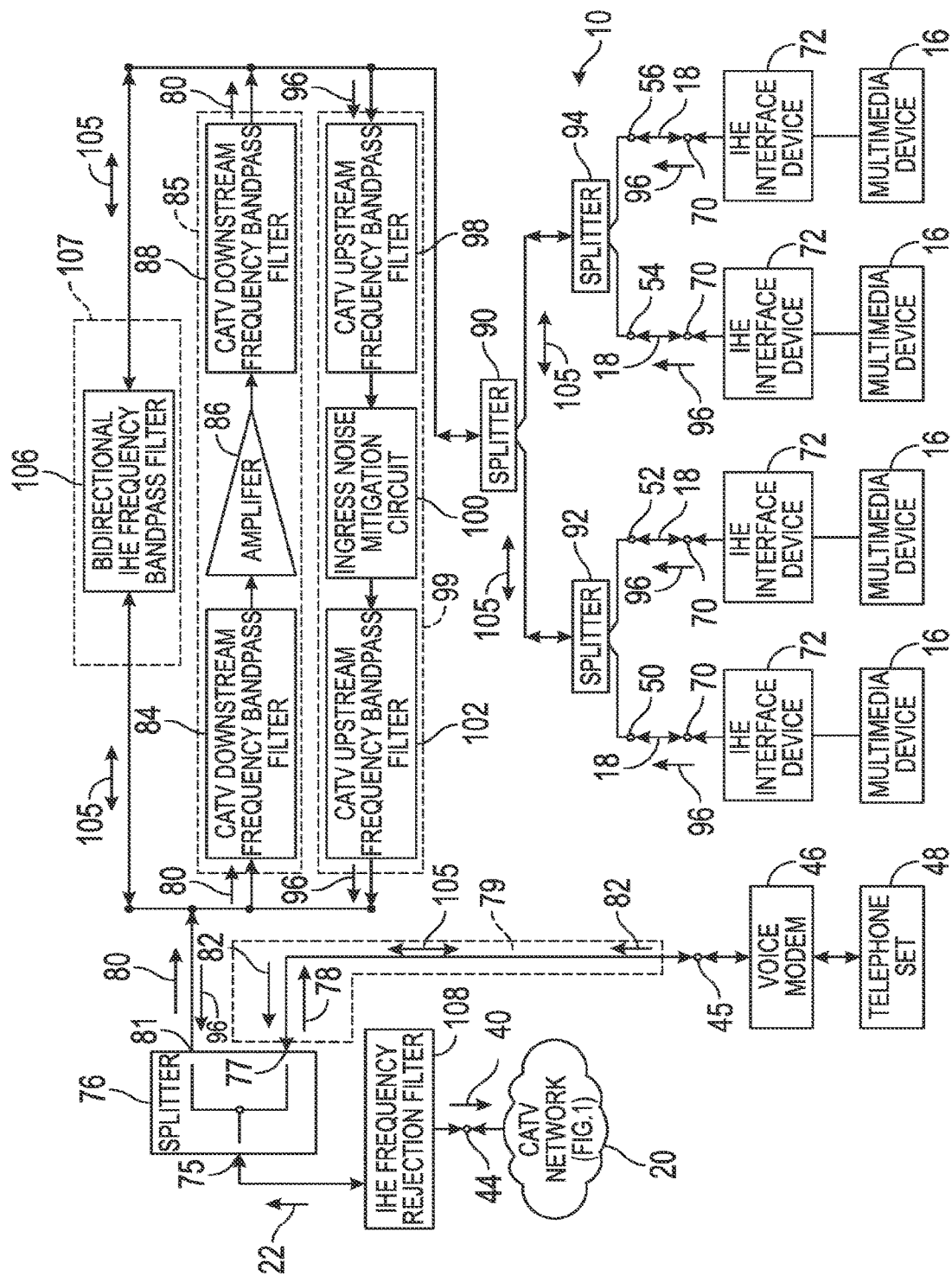
FIG. 3 is a block diagram of functional components of one embodiment of CATV entry adapter 10 shown in FIG. 2, shown connected to CATV network 20.

The internal functional components of one embodiment of CATV entry adapter 10 are shown in FIG. 3. Those internal circuit components include conventional bi-directional signal splitter/combiner 76 which separates downstream signals 22 from CATV network 20 at entry port 44 into passive CATV downstream signals 78 and active CATV downstream signals 80.

Bidirectional splitters/combiners as described in this document include an input or common terminal, and two output or signal component leg terminals. Signals received at the input or common terminal of a bidirectional splitter/combiner are divided into two signals, with one each presented to each of the output or signal component leg terminals. Signals received at the output or signal component legs of the bidirectional splitter/combiner are combined into a single signal and presented to the input or common terminal. Bidirectional splitter/combiner 76 includes input or common terminal 75, first signal component leg or output terminal 81, and second signal component leg or output terminal 77. Bidirectional splitter/combiner 76 in this embodiment conducts CATV downstream signals in the CATV downstream signal frequency range, CATV upstream signals in the CATV upstream signal frequency range, and IHE signals in the IHE signal frequency range between the common terminal and the first and second signal component legs.

Passive CATV downstream signals 78 are conducted directly to and through passive port 45 to passive subscriber equipment 46 and 48. Passive CATV upstream signals 82 are created by passive subscriber equipment 46 and 48 and are conducted through passive port 45 directly through CATV passive signal communication path 77 to signal splitter/combiner 76 to become upstream signals 40 in CATV network 20. The direct CATV passive signal communication path 79 for passive signals 82 in CATV entry adapter 10 contains no active electronic components that might fail or malfunction, thereby enhancing the reliability of CATV passive communications. CATV passive signal communication path 79 is intended to be as reliable as possible since it may be used in emergency and critical circumstances.

Active CATV downstream signals 80 are conducted to first CATV downstream frequency bandpass filter 84 in CATV active downstream signal communication path 85. Downstream filter 84 passes signals having frequencies in the CATV downstream signal frequency range of 54-1002 MHz, and rejects signals having frequencies in other ranges. The CATV downstream signals passed by the filter 84 are amplified by amplifier 86 and then supplied to second CATV downstream signal frequency bandpass filter 88, both of which are also part of CATV active downstream signal communication path 85.

The amplified and further filtered CATV downstream signals 80 are then conducted to bidirectional splitter/combiner 90, which splits or divides those signals into two identical CATV downstream signals 80. The two signals 80 from bidirectional splitter/combiner 90 are supplied as inputs to two other bidirectional splitters/combiners 92 and 94, respectively, which are connected in cascade with bidirectional splitter/combiner 90. Splitters/combiners 92 and 94 again split or divide each of their two input signals into two identical CATV downstream signals 80. The four output signals from the cascade-connected splitters/combiners 90, 92 and 94 are applied at the active ports 50, 52,54 and 56 of CATV entry adapter 10. Although four active ports 50, 52,54 and 56 are shown, more active ports are achieved by use of more splitters/combiners connected in cascade. To the extent that the multimedia devices 16 connected through coaxial cables 18 directly respond to CATV downstream signals 80, each IHE interface device 72 passes downstream signals 80 directly to multimedia devices 16. IHE interface device 72 does not modify or otherwise influence CATV downstream signals 80 passing through it.

In those cases where multimedia device 16 is capable of sending CATV upstream signals 96, those signals 96 are likewise passed through IHE interface device 72 without change or influence and are then conducted through cable outlet 70, coaxial cable 18 and active ports 50, 52, 54 or 56 to splitters/combiners 92 and 94. The splitters/combiners 92 and 94 combine all CATV upstream signals 96 and supply those upstream signals 96 to splitter 90. Splitter 90 combines the CATV upstream signals 96 from splitters 92 and 94 and supplies them to first CATV upstream frequency bandpass filter 98, which forms a part of CATV active upstream signal communication path 99. Filter 98 passes signals having frequencies in the CATV upstream signal frequency range of 5-42 MHz, and rejects signals having frequencies in other ranges. CATV upstream signals 96 passed by filter 84 are then preferably supplied to an ingress noise mitigation circuit 100. Ingress noise mitigation circuit 100 suppresses ingress noise in the range of 0-5 MHz that may have originated from noise sources within the subscriber premises. Ingress noise mitigation circuit 100 is optional in in the CATV entry adapter 10, but if employed, is preferably employed in the form described in U.S. patent application Ser. No. 12/250,227, filed Oct. 13, 2008, and titled Ingress Noise Inhibiting Network Interface Device and Method for Cable Television Networks, which is assigned to the assignee hereof. CATV upstream signals 96 leaving circuit 100 are applied to second CATV upstream frequency bandpass filter 102. Ingress noise mitigation circuit 100 and second CATV upstream bandpass filter 102 are part of CATV active upstream signal communication path 99. The filtered active upstream signals 96 leaving second filter 102 are supplied to first signal component leg 81 of bidirectional splitter/combiner 76, and are conducted through CATV entry port 44 to CATV network 20.

When CATV entry adapter 10 is used as a hub in IHE network 14, and passive subscriber equipment 46 and 48 is connected to the only passive port 45 of that entry adapter 10, as shown in FIG. 3, IHE network 14 exists only between and through the active ports 50, 52, 54 and 56, as is shown in FIG. 3. IHE signals 105 from IHE interface devices 72 are communicated through cable outlets 70, coaxial cables 18, active ports 50, 52, 54 and 56, and splitters/combiners 92, 94 and 90. IHE signals 105 traverse or jump between the outputs of the splitters/combiners. In this case, splitters/combiners 90, 92 and 94 connect all of the coaxial cables 18 at a common location so that all the IHE signals 105 may be conducted between all of the IHE interface devices 72.

Figure 4:
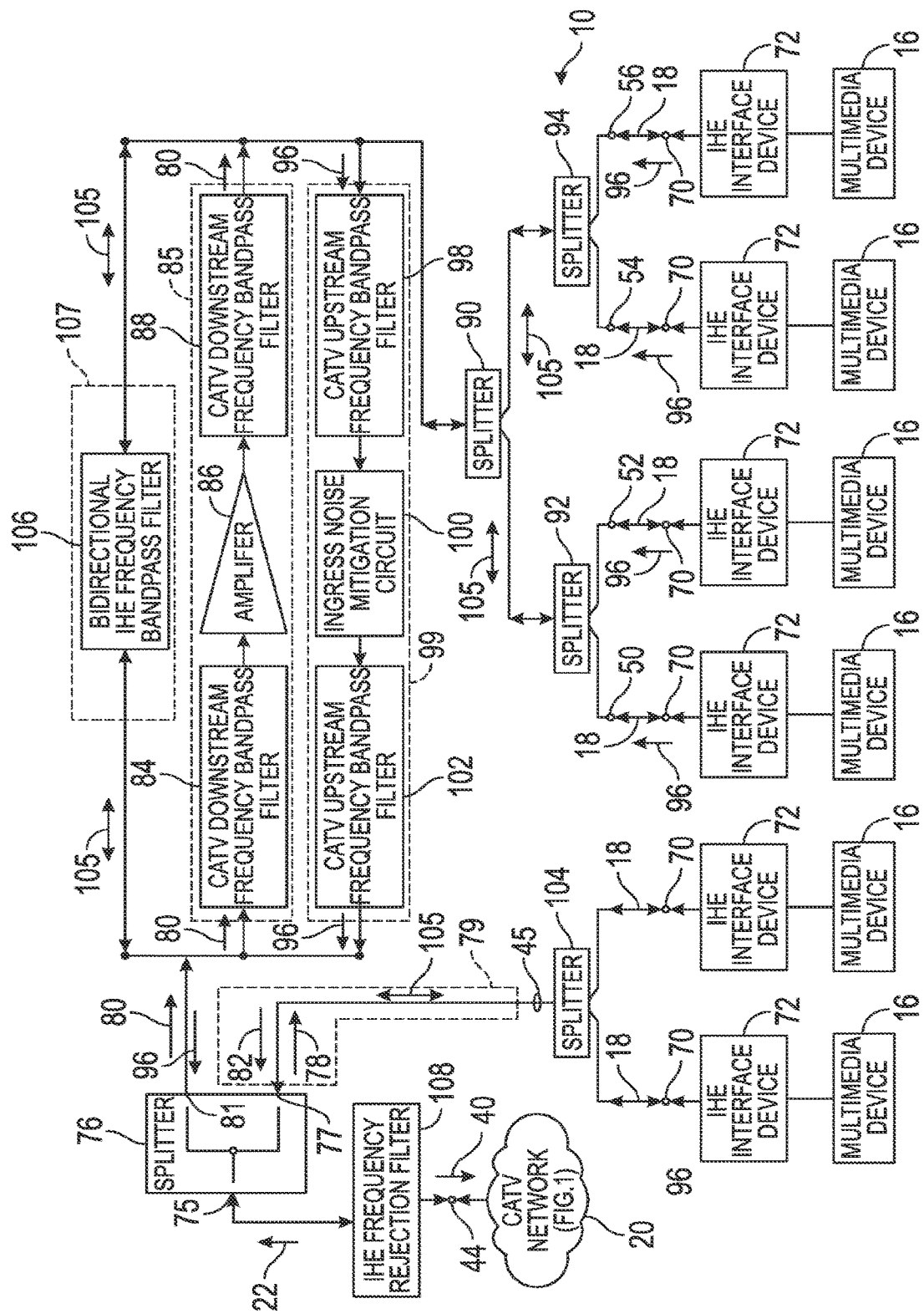
FIG. 4 is a block diagram similar to FIG. 3, illustrating the connection of additional IHE nodes 74 of IHE network 14 to passive port 45 of CATV entry adapter 10.

Whenever there is no life-line voice service connected to passive port 45 of CATV entry adapter 10, passive port 45 becomes available for use as part of IHE network 14, as is shown in FIG. 4. In a situation as shown in FIG. 4, splitter/combiner 104 has been connected externally to passive port 45 of CATV entry adapter 10. Consequently, splitter/combiner 104 is not built-in or incorporated within CATV entry adapter 10, but instead, splitter/combiner 104 is part of the in-home cable infrastructure. Coaxial cables 18 connect to splitter/combiner 104 and cable outlets 70 of those those coaxial cables connect to IHE interface devices 72 which are connected to multimedia devices 16 in the manner previously described.

IHE signals 105 conducted between the two IHE interface devices 72 connected to splitter 104 communicate with each other by traversing or jumping the legs of splitter/combiner 104. Il-IE signals 105 generated by the two IHE interface devices 72 are also conducted to splitter/combiner 76 where those signals will jump or traverse the legs of splitter/combiner 76. However, there is no direct communication path from splitter/combiner 76 through either CATV active downstream signal communication path 85 through components 84, 86 and 88 or through CATV active upstream signal communication path 99 through components 98, 100 and 102. The components within CATV upstream and downstream communication paths 85 and 99 severely attenuate IHE signals in the IHE frequency range of 1125-1625 MHz in this embodiment. Filters 84 and 86 in the CATV downstream communication path 85 and filters 98 and 102 in the CATV upstream communication path 99 reject IHE signals 105. Moreover, attempting to conduct IHE signals 105 in the reverse direction through amplifier 86 results in severe attenuation of IHE signals 105, if such conduction is even possible. A similar result applies when attempting to conduct IHE signals 105 through ingress noise mitigation circuit 100.

To permit CATV entry device 10 to communicate IHE signals 105 from passive port 45 to active ports 50, 52, 54 and 56, bidirectional IHE frequency bandpass filter 106 is connected directly, between splitters/combiner 76 and 78, in parallel with CATV upstream and downstream paths, as shown in 4. Bidirectional IHE frequency bandpass filter 106 forms IHE signal communication path 107 in this embodiment. IHE signal communication path 107 conducts IHE signals in the IHE signal frequency range between first signal component leg 81 and at least one of the plurality of active ports 50, 52, 54, or 56. IHE signal communication path 107 rejects signals of all other frequencies due to IHE frequency bandpass filter 106.

IHE frequency bandpass filter 106 passes IHE signals in the 1125-1675 MHz frequency range without significant attenuation. Consequently, signals 105 pass freely through filter 106 without substantial attenuation, where IHE signals 105 jump or traverse splitter/combiner 76 in substantially the same way that IHE signals jump or traverse splitters 90, 92, 94 and 104. IHE signals 105 traverse signal bidirectional splitter/combiner 76 between first signal component leg 81 and second signal component leg 77. IHE signals 105 traverse signal bidirectional splitter/combiner 76 between first signal component leg 81 and second signal component leg 77 to enable conduction of IHE signals 105 between IHE signal communication path 107 and CATV passive signal communication path 79. CATV passive signal communication path 79 conducts CATV downstream signals in the CATV downstream signal frequency range and CATV upstream signals in the CATV upstream signal frequency range between second signal component leg 77 and passive port 45. In this manner, all of the subscriber equipment multimedia devices 16 may communicate with each other through CATV entry adapter 10 without significant attenuation created by the active circuit components in the CATV upstream and downstream signal communication paths 85 and 99. However, including bidirectional IHE frequency bandpass filter 106 in the CATV entry adapter 10 has no adverse influence over its functionality in distributing CATV signals, because IHE frequency bandpass filter 106 rejects CATV active downstream and upstream signals 80 and 96 conducted through CATV active signal communication paths 85 and 99. Bidirectional IHE frequency bandpass filter 106 can also be connected to the input side of the splitter combiner 76, as shown in FIG. 5.

Figure 5:
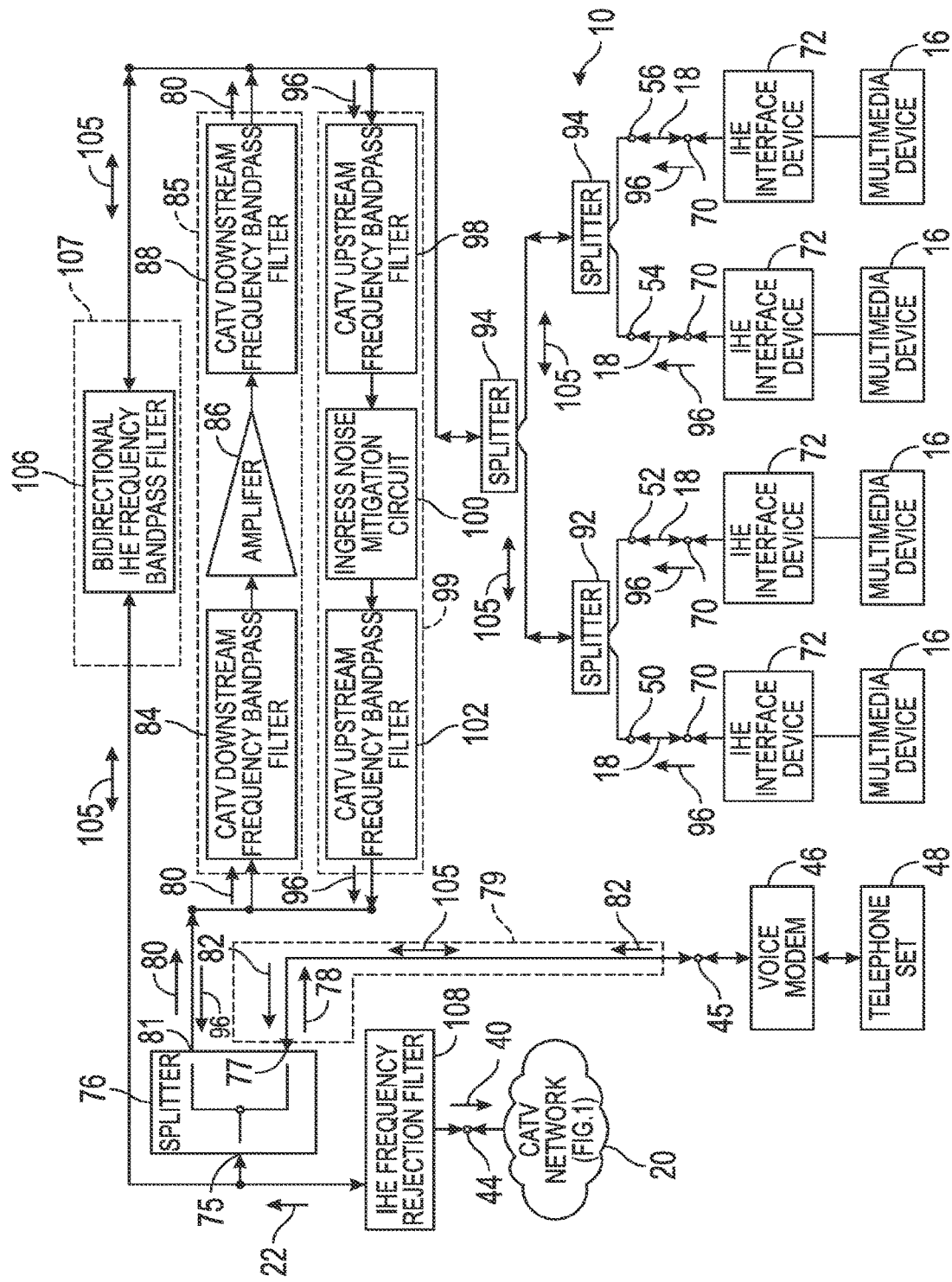
FIG. 5 is a block diagram of functional components of another embodiment of CATV entry adapter 10 of FIG. 2, shown connected to CATV network 20.

Another significant advantage of CATV entry adapter 10 as shown in FIG. 4 and FIG. 5 (and FIG. 8 discussed later in this document) is that it includes IHE frequency rejection filter 108 connected between splitter/combiner 76 and CATV network entry port 44. In the embodiment shown in the figures, IHE frequency rejection filter 108 is directly connected between signal bidirectional splitter/combiner 76 and CATV entry port 44. In some embodiments IHE frequency rejection filter 108 is formed internal to housing 58. IHE frequency rejection filter 108 prevents signals in the IHE frequency range from passing from splitter/combiner 76 into CATV network 20, but allows CATV downstream and CATV upstream signals to pass without impairment. IHE frequency rejection filter 108 absorbs the energy of any IHE signals, thereby preventing IHE signals 105 from reaching CATV network 20. Eliminating IHE signals by use of ME frequency rejection filter 108 prevents IHE signals from IHE network 14 from being received and comprehended at an adjacent subscriber premises. Without IHE frequency rejection filter 108 and as understood from FIG. 1, ME signals from one CATV entry adapter 10 could traverse the drop cables 38 to the cable tap 36, and from the cable tap through another drop cable 38 of that cable tap 36 to an adjacent CATV entry adapter 10. IHE frequency rejection filter 108 prevents this from happening. In addition to protecting the security and privacy of IHE signals within IHE network 14 in each subscriber premises 12, IHE frequency rejection filter 108 also prevents IHE signals from one subscriber premise from adversely influencing or deteriorating the quality of IHE signals in an adjacent IHE network connected to a cable tap 36 (FIG. 1).

CATV entry adapter 10 according to the invention as shown in FIG. 1 through FIG. 5 beneficially contributes to establishing an in-home entertainment (IHE) network. All of the active and passive ports of the CATV entry adapter are usable in the IHE network. CATV entry adapter 10 is therefore fully functional as an IHE network hub to communicate all IHE signals 105 between all IHE interface devices without substantially attenuating the strength of the IHE signals in such a way that the IHE interface devices are unable to compensate in the manner intended by the IHE communication protocol. CATV entry adapter 10 prevents or greatly inhibits IHE signals from reaching CATV network 20. Doing so does not compromise the privacy and security of IHE content which is expected to be maintained only within the IHE network of the subscriber premises. By confining the IHE signals to the IHE network at the subscriber premises, IHE signals are not available over the CATV network to interfere with other IHE networks established at other subscriber premises. The advantageous functionality of CATV entry adapter 10 in regard to IHE network communications is protected within the housing of the CATV entry adapter, to shield it from unauthorized removal, tampering, forgetfulness in original installation, and physical exposure. CATV entry adapter 10 does not inhibit or otherwise adversely influence normal CATV signal distribution functionality. The multi-functional aspects of CATV entry adapter 10 allow it to be used in a wide variety of situations, thereby increasing its economies of scale and facilitating greater convenience in installation by the CATV service provider. In addition, use of CATV entry adapter 10 allows subscribers more flexibility in expanding and changing both their CATV subscriber equipment and their IHE network and multimedia devices.

Figure 6:
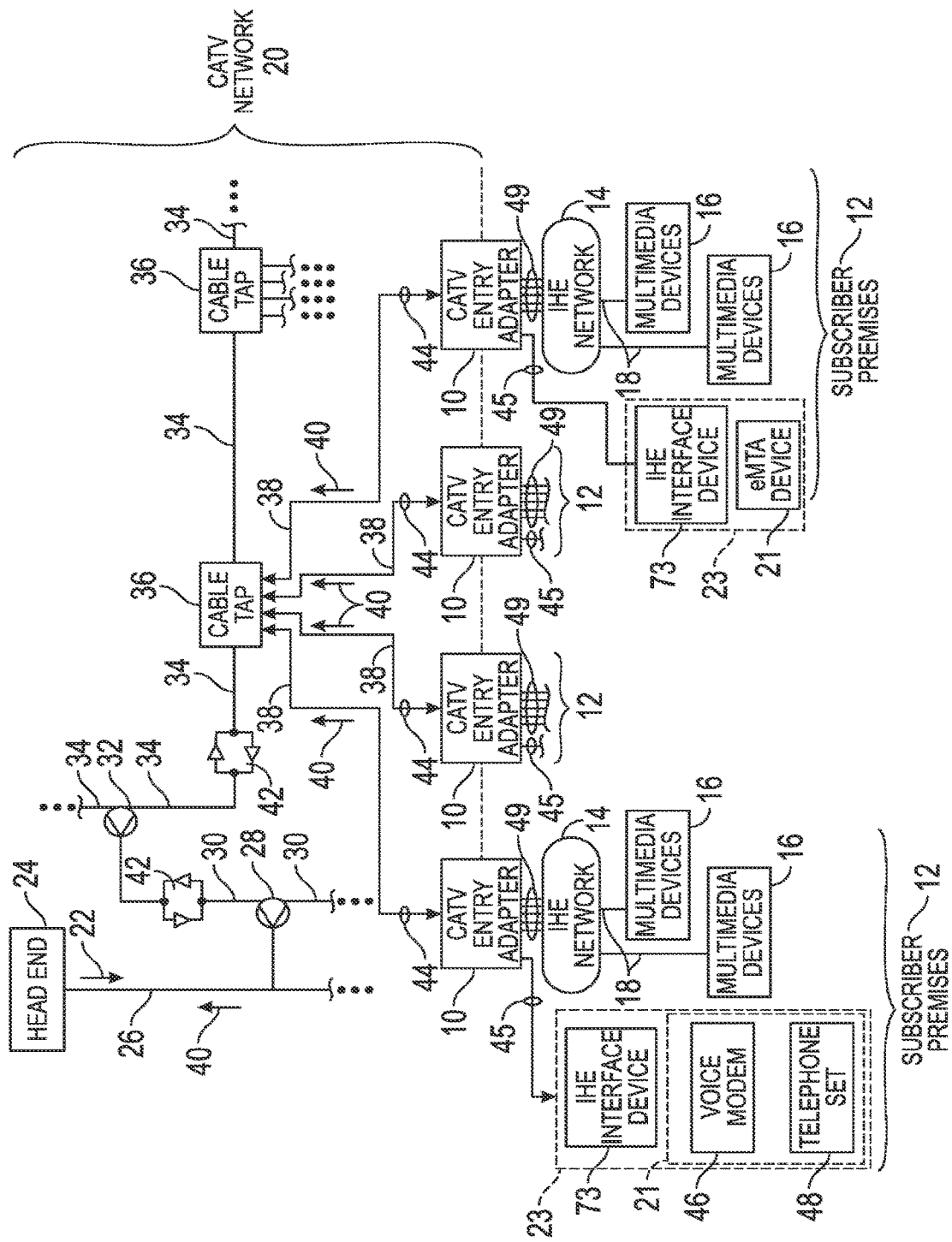
FIG. 6 is a block diagram illustrating a further embodiment of a plurality of CATV entry adapters 10 according to the invention, shown interconnecting CATV network 20 and a plurality of In-Home Entertainment networks 14 each located at one of a plurality of subscriber premises 12.

FIG. 6 shows a block diagram of a further embodiment of CATV network 20, subscriber premises 12 and a plurality of CATV entry devices 10 according to the invention, some of which have eMTA device 21 connected to passive port 45 of CATV entry adapter 10. EMTA device 21 includes voice modem 46 and telephone set 48 in this embodiment. Subscriber equipment 16 and eMTA device 21 receive CATV downstream signals from CATV network 20, and subscriber equipment 16 and eMTA device 21 send CATV upstream signals to CATV network 20. CATV upstream and downstream signals communicated between CATV network 20 and eMTA device 21 are passive CATV signals 82 and 78 respectively. The CATV upstream and downstream signals sent to and received by CATV network 20 by the other subscriber equipment are active CATV signals 96 and 80, respectively. An IHE-enabled eMTA device 23 also communicates IHE signals 105 using IHE network 14. An IHE-enabled eMTA device 23 includes a conventional eMTA device 21 and an IHE interface device 73. The IHE interface device 73 permits communication of IHE signals among all IHE-enabled multimedia devices 16.

CATV entry adapter 10 functions as a hub in IHE network 14, to effectively transfer or distribute IHE signals between multimedia devices 16 and eMTA interface device 73. In this manner, CATV entry adapter 10 in this embodiment effectively communicates IHE signals 105 between the IHE-enabled eMTA device 23—a first one of the plurality of pieces of subscriber equipment coupled to entry adapter 10—and multimedia devices 16 coupled to the active ports—one of which is a second one of the plurality of pieces of subscriber equipment coupled to entry adapter 10 thereby distributing the functionality of the eMTA device 23 to the multimedia devices 16 throughout the subscriber premises. CATV entry adapter 10 also functions in a conventional role as an interface between CATV network 20 and subscriber equipment 16 and 23 located at subscriber premises 12, communicating CATV signals between subscriber equipment 16 and CATV network 20. These and other improvements and functions are described in greater detail below.

CATV entry adapter 10 receives CATV downstream signals 22 from the CATV network 20 at CATV network connection or entry port 44 as described above. Passive CATV downstream signals 78 are conducted through CATV entry adapter 10 to eMTA device 21 without amplification, enhancement, modification or other substantial conditioning (FIG. 3). Passive CATV downstream signals 78 are delivered from passive port 45 to passive subscriber equipment, i.e. eMTA device 23 represented by the voice modem 46 connected to telephone set 48 through IHE-enabled eMTA device 21.

CATV subscriber equipment 16 generates upstream signals 40 and delivers them to the CATV entry adapter 10 for delivery to the CATV network 20 as described above.

Figure 7:
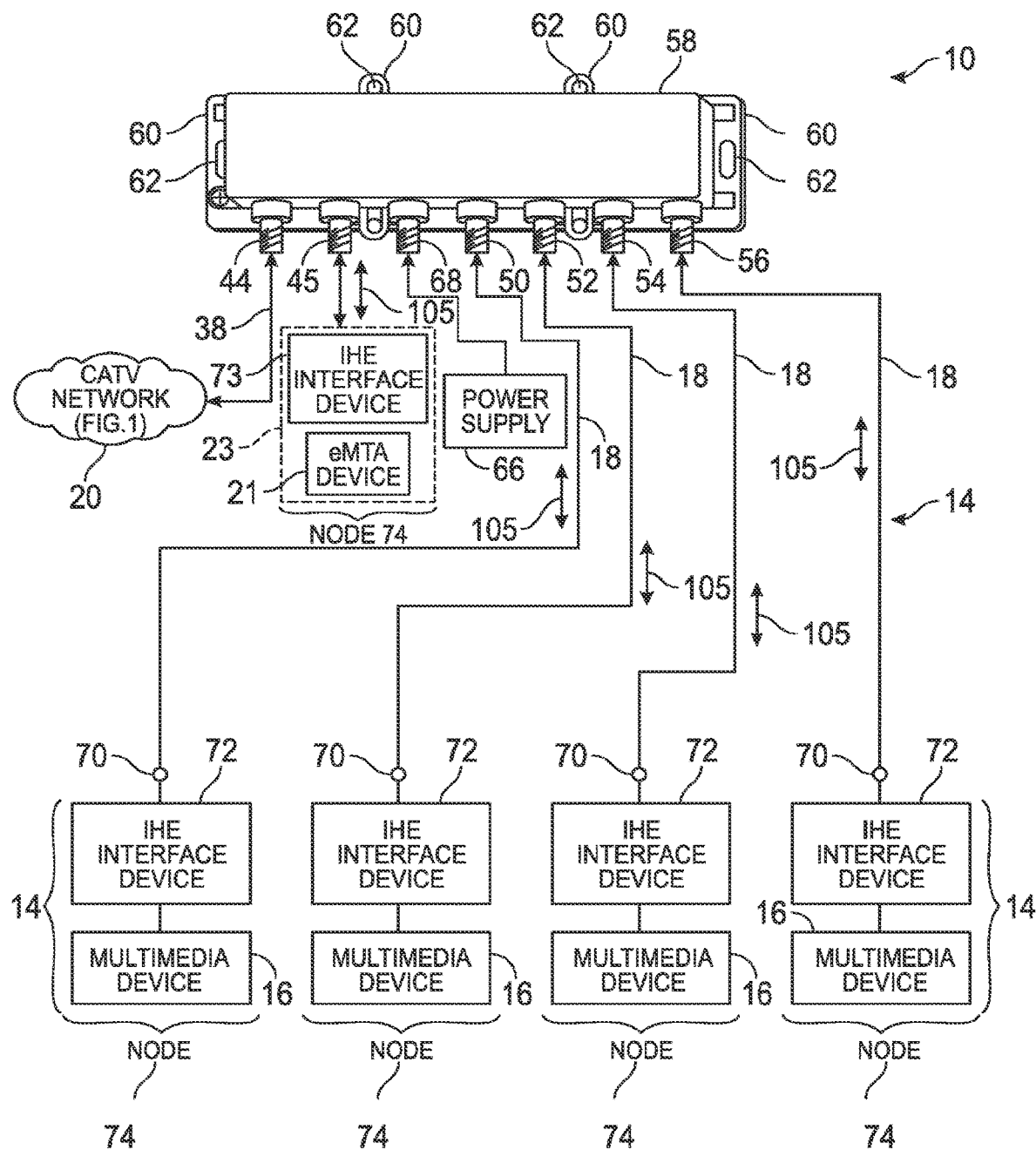
FIG. 7 is a generalized perspective view of another embodiment of CATV entry adapter 10 according to the invention, connected to IHE network 14 in one subscriber premises 12, with more details of IHE network 14 and active and passive subscriber equipment 16 and 21 connected to CATV entry adapter 10 shown in block diagram form, and also showing components forming nodes 74 of IHE network 14.
Figure 8:
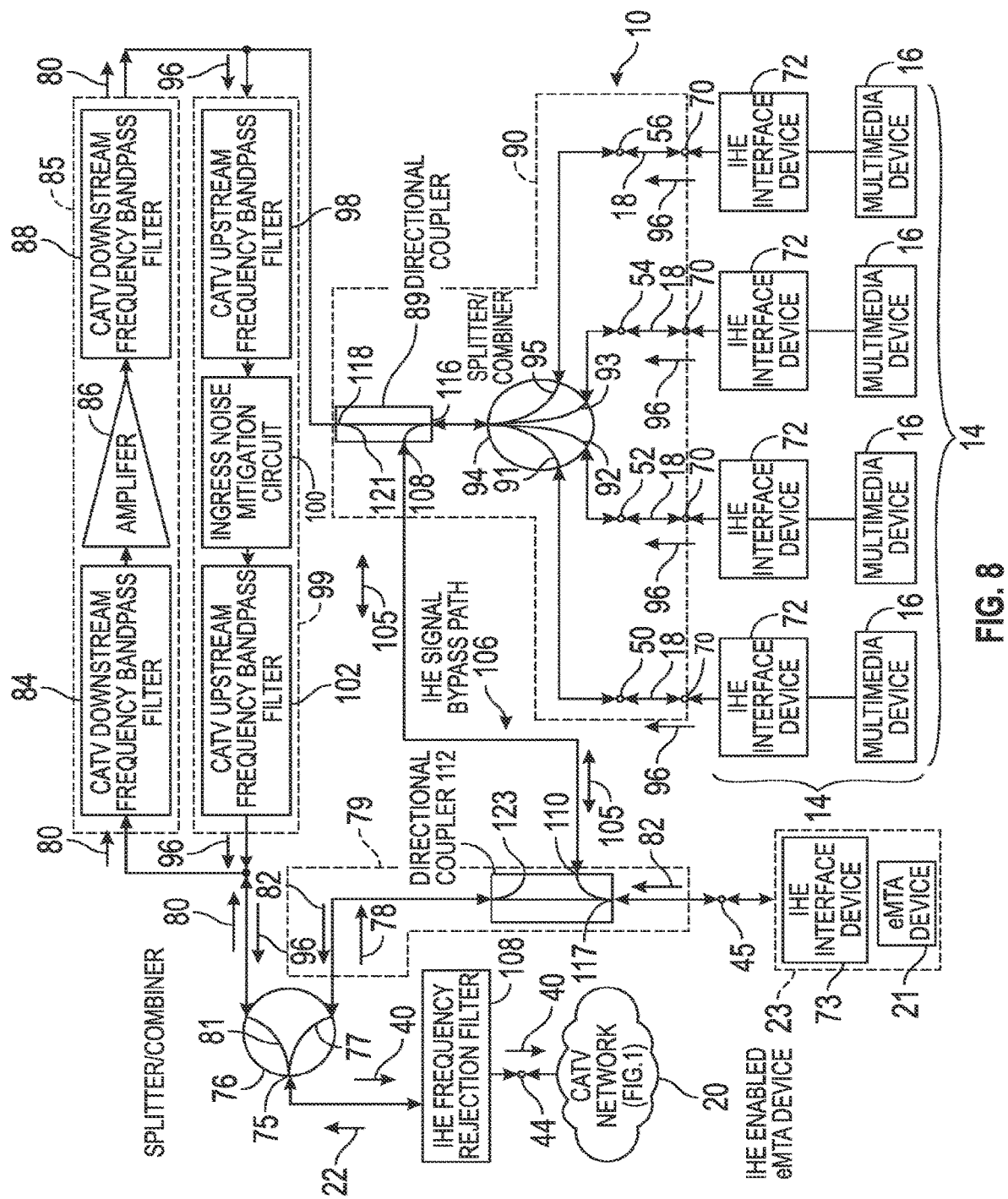
FIG. 8 is a block diagram of functional components of an embodiment of CATV entry adapter 10 shown in FIG. 7, shown connected to CATV network 20.

More details concerning CATV entry device 10 according to the invention as shown in FIG. 6 are shown in FIG. 7 and FIG. 8. CATV entry adapter 10 includes a housing 58 which encloses internal electronic circuit components (shown in one embodiment in FIG. 8). A mounting flange 60 surrounds the housing 58 and holes 62 in the flange 60 allow attachment of the CATV entry adapter 10 to a support structure at the subscriber premises, as described earlier. CATV network 20 is connected to the CATV network connection entry port 44 of CATV entry adapter 10.

The ports 44,45,50,52,54,56 and 68 are each preferably formed by a conventional female coaxial cable connector which is mechanically connected the housing 58 and which is electrically connected to internal components of CATV entry adapter 10. Coaxial cables 18 from subscriber premises 12 cable infrastructure and drop cables 38 (FIG. 1 and FIG. 6) are connected to CATV entry adapter 10 by mechanically connecting the corresponding mating male coaxial cable connectors (not shown) on these coaxial cables to the female coaxial cable connectors forming the ports 44, 45, 50, 52, 54, 56 and 68.

One CATV entry adapter 10 is located at each subscriber premises. The number of active and passive ports 45, 50, 52, 54 and 56 is dictated by the number of coaxial cables 18 which are routed throughout the subscriber premises. Although CATV entry adapter 10 shown in FIG. 7 and FIG. 8 includes seven ports, other entry adapters may have a larger or smaller number of ports. The number and routing of the coaxial cables 18 within the subscriber premises constitute the in-home or subscriber premise cable infrastructure that is used by the IHE network 14 (FIG. 6).

Since the CATV service provider provides the CATV entry adapter 10 for use by each CATV subscriber, it is advantageous to reduce the number of different configurations of CATV entry adapters that subscribers may require. With the improvements described below, CATV entry adapter 10 in the embodiment shown in FIG. 6 through FIG. 8 permits the effective use of subscriber equipment that includes both eMTA devices 23 and multimedia devices 16 connected in IHE network 14, without degrading or compromising the VOIP service supplied to IHE-enabled eMTA device 23.

Although the IHE interface devices 72 are shown as separate from multimedia devices 16, in some embodiments an IHE interface device 72 is incorporated within or is an integral part of an IHE-IHE-enabled multimedia device 16. However, for those multimedia devices 16 which do not include a built-in IHE interface device 72, a separate IHE-enabled device 72 is connected to the multimedia device 16 to thereby allow it to participate as a node in IHE network 14.

EMTA device 21 participates in IHE network 14 due to the connection of eMTA device 21 to IHE interface device 73. The combination of eMTA device 21 and the connected IHE interface device 73 constitutes IHE-enabled eMTA device 23. IHE interface device 73 may be an integral part of eMTA device 23. IHE interface device 73 is similar to the IRE interface devices 72 in communicating IHE signals, but IHE interface device 73 has the additional functional capability of communicating passive CATV signals to and from eMTA device 23 when no electrical power is available to IHE interface device 73.

The internal functional components of CATV entry adapter 10 according to the invention of FIG. 6 through FIG. 8 are shown in FIG. 8. Those internal circuit components include first conventional bi-directional signal splitter/combiner 76 which splits downstream signals 22 from CATV network 20 received at common terminal 75 from entry port 44. Downstream signals 22 are split into passive CATV downstream signals 78 at second signal component leg 77 and into active CATV downstream signals 80 at first signal component leg 81. Passive CATV downstream signals 78 are conducted in CATV passive signal communication path 79 to and through passive port 45, through IHE interface device 73 and to eMTA device 21. Passive CATV upstream signals 82 are created by eMTA device 21 and are conducted through IHE interface device 73, passive port 45 and CATV passive signal communication path 79 to second signal component leg 77 of signal splitter/combiner 76 to become CATV upstream signals 40 in CATV network 20. CATV passive signal communication path 79 for the passive CATV signals in CATV entry adapter 10 contains no power-consuming active electronic components that might fail or malfunction, thereby enhancing the reliability of CATV passive communications. CATV passive signal communication path 79 is intended to be as reliable as possible since it is used in emergency and critical circumstances.

Active CATV downstream signals 80 from first signal component leg 81 of splitter/combiner 76 are conducted to first CATV downstream frequency bandpass filter 84 in CATV active downstream signal communication path 85. Downstream filter 84 passes signals having frequencies in the CATV downstream frequency range of 54-1002 MHz, and rejects signals having frequencies in other ranges. Downstream signals 80 passed by filter 84 are amplified by amplifier 86 and then supplied to second CATV downstream frequency bandpass filter 88, both of which are also part of CATV active downstream signal communication path 85.

The amplified and further filtered active CATV downstream signals 80 are conducted through active-side directional coupler 89 which forms part of combined signal communication path 90. CATV downstream signals 80 are conducted through active-side directional coupler 89 to a common terminal of second conventional bidirectional splitter/combiner 94 which also forms part of combined signal communication path 90. Second splitter/combiner 94 splits or divides active CATV downstream signals 80 into four identical CATV downstream signals, each of which has approximately one-fourth of the power or signal strength of CATV downstream signal 80 initially applied to the splitter/combiner 94. Each of the split signals is delivered from one of four separate signal component legs 91, 92, 93 and 95 of splitter/combiner 94. The four split signals from signal component legs 91, 92, 93 and 95 of the splitter/combiner 94 are applied at active ports 50, 52, 54 and 56 of CATV entry adapter 10, respectively. Although four active ports 50, 52, 54 and 56 are shown, more active ports are achieved by use of a splitter/combiner with a different number of signal component legs, or by use of multiple cascaded splitters/combiners, to derive the desired number of split signals to be applied to all of the active ports of CATV entry adapter 10.

To the extent that multimedia devices 16 connected through coaxial cables 18 to active ports 50, 52, 54, and 56 respond to CATV downstream signals 80 available at the active ports 50, 52, 54 and 56, each IHE interface device 72 passes those downstream signals directly to connected multimedia device 16. The IHE interface device 72 does not modify or otherwise influence CATV downstream signals 80 passing through it. In those cases where multimedia device 16 is capable of sending CATV upstream signals 96, those CATV upstream signals 96 are likewise passed through the IHE interface device 72 without change or influence and are then conducted through cable outlet 70, coaxial cable 18 and active ports 50, 52, 54 or 56 to splitter/combiner 94. Splitter/combiner 94 combines all CATV upstream signals 96 and supplies those signals as combined active upstream signals 96 to active-side directional coupler 89.

CATV upstream signals 96 from active-side directional coupler 89 are supplied to first CATV upstream frequency bandpass filter 98, which forms a part of CATV active upstream signal communication path 99. Filter 98 passes signals having frequencies in the CATV upstream frequency range of 5-42 MHz, and rejects signals having frequencies in other ranges. CATV upstream signals 96 passed by filter 98 are then supplied to ingress noise mitigation circuit 100. Ingress noise mitigation circuit 100 suppresses ingress noise in the range of 0-42 MHz that may have originated from noise sources within subscriber premises 12. Use of ingress noise mitigation circuit 100 is optional in CATV entry adapter 10, but if employed, noise mitigation circuit 100 is preferably employed in the form described in U.S. patent application Ser. No. 12/250,227, filed Oct. 13, 2008, and titled Ingress Noise Inhibiting Network Interface Device and Method for Cable Television Networks, which is assigned to the assignee hereof.

CATV upstream signals 96 leaving ingress noise mitigation circuit 100 are then applied to second CATV upstream frequency bandpass filter 102. Second CATV upstream frequency bandpass filter 102 is also optional for use. Second upstream bandpass filter 102 may not be necessary if first upstream bandpass filter 98 provides sufficient frequency filtering characteristics and ingress noise mitigation circuit 100 is not used. Second upstream bandpass filter 102 may also be eliminated under certain circumstances, even when ingress noise mitigation circuit 100 is used. Ingress noise mitigation circuit 100 and second CATV upstream bandpass filter 102 are part of CATV active upstream signal communication path 99.

Active CATV upstream signals 96 from CATV active upstream signal communication path 99 are supplied to first signal component leg 81 of first splitter/combiner 76. Passive CATV upstream signals 82 from CATV passive signal communication path 79 are supplied to second signal component leg 77 of first splitter/combiner 76. Splitter/combiner 76 combines the signals supplied to its signal component legs 77 and 81 to form a single combined upstream signal 40 which is supplied through entry port 44 to CATV network 20.

When CATV entry adapter 10 is used as a hub in IHE network 14 (FIG. 1 and FIG. 6), and non-ME-enabled subscriber equipment (not shown) is connected to the only passive port 45 of that entry adapter 10, the IHE network 14 exists only between and through active ports 50, 52, 54 and 56. IHE signals 105 from IHE interface devices 72 are communicated through the cable outlets 70, the coaxial cables 18, the active ports 50, 52, 54 and 56, and the splitter 94. Splitter 94 has a conventional construction with relatively low isolation between all of its signal component legs 91, 92, 93 and 95 in the IHE signal frequency range to facilitate IHE signal communication between its signal component legs of 91, 92, 93 and 95. In this manner, splitter 94 conducts ME signals 105 to all of the coaxial cables 18 connected to entry adapter 10 to achieve IHE signal communication among all of the IHE interface devices 72.

Attaching non-IHE-enabled eMTA subscriber equipment to the passive port 45 deprives the subscriber of the benefits of using passive port 45 as part of IHE network 14. Connecting IHE-enabled subscriber equipment, such as IHE-enabled eMTA device 23, to passive port 45, allows IHE-enabled eMTA device 23 to participate in IHE network 14. When the IHE-enabled eMTA device 23 is connected to passive port 45, the subscriber obtains the capability to distribute the telephony and other services to other multimedia devices 16 in IHE network 14. Exemplary multimedia devices 16 which may receive the distributed telephone service include auxiliary telephones and answering machines, among other devices.

When IHE-enabled passive subscriber equipment, such as the IHE-enabled eMTA device 23 is connected to the passive port 45, as shown in FIG. 6 through FIG. 8, IHE network 14 includes passive port 45 and active ports 50, 52, 54 and 56. IHE signals 105 are not conducted through CATV active upstream and downstream signal communication paths 99 and 85 because filters 84, 88, 98 and 102 severely attenuate IHE signals in the 1125-1675 MHZ frequency range. Moreover, attempting to conduct IHE signals in the reverse direction through amplifier 86 results in severe attenuation of those signals, if such conduction is even possible. A similar result applies when attempting to conduct IHE signals through ingress noise mitigation circuit 100.

To permit CATV entry adapter 10 to communicate signals 105 from passive port 45 to active ports 50, 52, 54 and 56, an IHE signal bypass path 106 is established between CATV passive signal communication path 79 and combined signal communication path 90. IHE signal bypass path 106 includes active-side directional coupler 89 and passive-side directional coupler 112. IHE signal bypass path 106 extends between coupled port 108 of active-side directional coupler 89 and coupled port 110 of passive-side directional coupler 112.

Arranged in this manner, passive-side directional coupler 112 is part of CATV passive signal communication path 79, and active-side directional coupler 89 is part of combined signal communication path 90. IHE signal bypass path 106 connects to CATV active signal communication paths 85 and 99.

Directional couplers 89 and 112 are of conventional construction, and each has four ports: coupled ports 108 and 110; input ports 116 and 117, through ports 118 and 119; and isolated ports 121 and 123, respectively. Isolated ports 121 and 123 are terminated in their appropriate characteristic impedance (not shown) in entry adapter 10. The conventional functionality of each coupler 89 and 112 causes the majority of power incident at input ports 116 and 117 to flow through the directional couplers to through ports 118 and 119, with a residual amount of the input power flowing to coupled ports 108 and 110. Substantially none of the power incident at input ports 116 and 117 is coupled to isolated ports 121 and 123. In addition, power incident to the coupled port will flow to the input port and will be isolated from the through port. In this manner, IHE signals 105 from IHE interface devices 72 and 73 are readily conducted through coupled ports 108 and 110 and through IHE signal bypass path 106, thereby assuring relatively strong IHE signal communication between the IHE-enabled devices connected to ports 45 and 70.

The conventional functionality of each coupler 89 and 112 causes the majority of power incident at through ports 118 and 119 to flow to input ports 116 and 117. Substantially none of the power incident at through ports 118 and 119 is coupled to coupled ports 108 and 110. The amount of the incident power applied at input ports 116 and 117 which flows to coupled ports 108 and 110 is established by the coupling factor associated with each directional coupler. The extent of the power rejected at the isolated ports is established by a rejection factor associated with each directional coupler. The coupling and rejection factors also apply respectively to the coupling and isolation of incident power at through ports 118 and 119 with respect to isolated ports 121 and 123 and coupled ports 108 and 110.

Signal paths through directional couplers 89 and 112 from input ports 116 and 117 to through ports 118 and 119, respectively, are referred to herein as "main legs." Signals passing in either direction through the main legs incur a small amount of signal attenuation, preferably less than one or two decibels (dB), as described above. Signal paths through directional couplers 89 and 112 from input ports 116 and 117 to coupled ports 108 and 110 are referred to herein as "directional legs." Signals passing in either direction through the directional legs incur a modest amount of signal attenuation of around 10 to 20 dB, as described above. Signals are substantially prevented from passing between through ports 118 and 119 and coupled ports 108 and 110, respectively, due to the normal functionality of directional couplers 89 and 112, as described above.

Input ports 116 and 117 of directional couplers 89 and 112 are connected to the common terminal of splitter 94 and passive port 45, respectively. Through port 118 of directional coupler 89 is operatively connected to first signal component leg 81 of splitter/combiner 76 through CATV active downstream and upstream signal communication paths 85 and 99. Through port 119 of directional coupler 112 is operatively connected to second signal component leg 77 of splitter/combiner 76. The small amount of signal attenuation which the CATV signals incur passing through the main legs of directional couplers 89 and 112 does not impact the functionality of IHE-enabled eMTA device 23 or the other subscriber equipment which may be connected to the active ports of CATV entry adapter 10.

IHE signals 105 which originate from IHE interface device 73 are communicated to IHE interface devices 72 by passing through IHE signal bypass path 106, i.e. through passive port 45, input port 117 of passive-side directional coupler 112, the directional leg and coupled port 110 of passive-side directional coupler 112, IHE signal bypass path 106, coupled port 108 and directional leg of active-side directional coupler 89, and input port 116 of active-side directional coupler 112. The signals are then conducted through splitter 94, and active ports 50, 52, 54 and 56 to IHE interface devices 72.

Similarly, IHE signals 105 which originate from the IHE interface devices 72 are communicated to IHE interface device 73. These IHE signals 105 pass through splitter 94, input port 116 of active-side directional coupler 89, coupled port 108 and the directional leg of active-side directional coupler 89, IHE signal bypass path 106, coupled port 110 and the directional leg of passive-side directional coupler 112, and input port 117 of passive-side directional coupler 112, to passive port 45. In this manner, IHE-enabled eMTA device 23 communicates with IHE interface devices 72 and multimedia devices 16 within IHE network 14.

Since the directional couplers 89 and 112 are not frequency suppressive, CATV upstream signals 82 and 96 as well as IHE signals 105 are conducted through IHE signal bypass path 106. However, any CATV upstream signals which are communicated through IHE signal bypass path 106 are ignored by IHE-enabled eMTA device 23 and/or IHE interface devices 72 and 73 which receive them.

The use of directional couplers 89 and 112 to establish IHE signal bypass path 106 within CATV entry adapter 10 is beneficial in several important regards. Since IHE signal bypass path 106 does not contain a frequency filter, the problems of tuning a third frequency filter in parallel with the two active downstream and upstream signal communication paths 85 and 99 is avoided. Using only two parallel frequency specific signal communication paths 85 and 99 greatly simplifies the tuning of the bandpass filters in those signal communication paths compared to the complexity of tuning filters in three parallel frequency-specific signal communication paths. The directional couplers 89 and 112 do not require power to operate, thereby allowing IHE-enabled eMTA device 23 to communicate with CATV network 20 in situations where power to CATV entry adapter 10 is interrupted. Directional couplers 89 and 112 are readily available components-which simplify the manufacturing of CATV entry adapter 10.

IHE signal bypass path 106 and directional couplers 89 and 112 effectively extend IHE network 14 to include IHE compatible devices connected to passive port 45, in addition to those connected to active ports 50, 52, 54 and 56. The inclusion of passive port 45 within network 14 enables an IHE compatible device connected to passive port 45, such as IHE-enabled eMTA device 23, to communicate with multimedia devices 16 within IHE network 14. Multimedia devices 16 which may beneficially communicate with ME-enabled MLA device 23 include auxiliary phones and automated answering machines, among other multimedia devices.

CATV entry adapter 10 also includes an IHE frequency rejection filter 108 connected between splitter/combiner 76 and CATV network entry port 44. IHE frequency rejection filter 108, as described earlier, prevents IHE signals from passing from entry adapter 10 into CATV network 20, but allows upstream and downstream CATV signals to pass without significant impairment. IHE frequency rejection filter 108 absorbs the energy of IHE signals, thereby preventing IHE signals from reaching CATV network 20. IHE frequency rejection filter 108 also prevents the IHE signals from IHE network 14 (FIG. 1 and FIG. 6) from being received at an adjacent subscriber premises 12, as discussed earlier.

CATV entry adapter 10 beneficially contributes to the quality of service available from CATV network 20 and from IHE network 14. CATV entry adapter 10 is fully functional as an IHE network hub to communicate adequate strength IHE signals between all IHE interface devices and multimedia devices, while simultaneously preserving the intended CATV functionality. IHE frequency rejection filter 108 avoids compromising the privacy and security of the IHE content which is expected to be maintained only within the IHE network of each subscriber's premises. The advantageous functionality of the CATV entry adapter is obtained within the housing of the CATV entry adapter, thereby shielding that desirable functionality from unauthorized tampering, negligence in installation, and physical exposure. The multi-functional aspects of the CATV entry adapter allow it to be used in many situations, thereby increasing its economies of scale and use and facilitating greater convenience in installation by the CATV service provider. The CATV entry adapter 10 allows subscribers more flexibility in expanding and changing both their CATV subscriber equipment and their IHE network and multimedia devices.

The significance of these and other improvements and advantages will become apparent upon gaining a full appreciation of the present invention. A preferred embodiment of the invention and many of its improvements have been described above with a degree of particularity. The detailed description is of a preferred example of implementing the invention. The details of the description are not necessarily intended to limit the scope of the invention. The scope of the invention is defined by the following claims.

What is claimed is:

1. An entry device for communicating external network signals between an in-home network and an external network, for communicating in-home network signals within the in-home network, and for preventing the in-home network signals from being communicated from the in-home network to the external network, the entry device comprising:
   an entry port configured to communicate the external network signals with the external network;
   a first network port configured to be coupled to a first interface of the in-home network;
   a plurality of second network ports each configured to be coupled to a second interface of the in-home network;
   a first splitter electrically connected to the entry port having a first leg and a second leg, wherein the first network port is electrically connected to the first leg;
   an in-home network signal blocking device, wherein the in-home network signal blocking device is configured to permit the external network signals to pass therethrough depending on the external network signals being in a first frequency band, and to block the in-home network signals from passing therethrough depending on the in-home network signals being in a second frequency band that is different from the first frequency band;
   a second splitter electrically connected to the second leg of the first splitter, and having a plurality of output legs each being electrically connected to respective second network ports of the plurality of second network ports, wherein the second splitter is configured to provide bidirectional communication of the in-home network signals among the plurality of second network ports;
   a signal attenuation and communication device, wherein the signal attenuation and communication device is configured to:
      permit the external network signals to communicate between the entry port and the first network port, and between the entry port and the second network ports, at least partially depending on the external network signals being in the first frequency band; and
      block and permit communication of the in-home network signals between the first network port, the second network port, and the entry port at least partially depending on a direction in which the in-home network signals are travelling and at least partially depending on the in-home network signals being in the second frequency band and not in the first frequency band, such that the signal attenuation and communication device is configured to block at least some of the in-home network signals from reaching the entry port, and permit the in-home network signals to communicate between the first and second network ports; and
   wherein the first frequency band is 5-1002 MHz, and wherein the second frequency band is 1125-1675 MHz.

2. The entry device of claim 1, wherein the in-home network signal blocking device comprises a low-pass filter.

3. The entry device of claim 1, wherein the signal attenuation and communication device is configured to:
   block the in-home network signals from communicating from the first network port to the entry port;
   block the in-home network signals from communicating from the second network ports to the entry port; and
   permit the in-home network signals to communicate between the first and second network ports.

4. The entry device of claim 1, wherein the signal attenuation and communication device comprises one or more directional couplers and the one or more directional couplers comprise:
a first directional coupler having a coupled port, an input port electrically connected to the second splitter, a through port electrically connected to the first splitter, and an isolated port that is terminated; and
a second directional coupler having a coupled port electrically connected to the coupled port of the first directional coupler, an input port electrically connected to the first network port, a through port electrically connected to the first splitter, and an isolated port that is terminated.

5. An entry device for communicating external network signals between an in-home network and an external network, for communicating in-home network signals within the in-home network, and for preventing the in-home network signals from being communicated from the in-home network to the external network, the entry device comprising:
an entry port configured to communicate the external network signals with the external network;
a first network port configured to be coupled to a server network interface of the in-home network;
a plurality of second network ports each configured to be coupled to a client network interface of the in-home network;
a first splitter electrically connected to the entry port and having a first leg and a second leg, wherein the first network port is electrically connected with the first leg; and
a signal attenuation and communication device, wherein the signal attenuation and communication device is configured to:
permit upstream and downstream external network signals to communicate between the entry port and the first network port, and between the entry port and the second network ports; and
block and permit communication of in-home network signals between the first network port, the second network port, and the entry port at least partially depending on a direction in which the in-home network signals are travelling, so as to block the in-home network signals from reaching the entry port, and permit the in-home network signals to communicate between the first and second network ports.

6. The entry device of claim 5, wherein the signal attenuation and communication device is configured to:
block in-home network signals from communicating from the first network port to the entry port;
block in-home network signals from communicating from the second network port to the entry port; and
permit in-home network signals to communicate between the first and second network ports.

7. The entry device of claim 5, wherein the signal attenuation and communication device is configured to permit communication of the external network signals at least partially depending on the external network signals being in a first frequency band and not in a second frequency band, and wherein the signal attenuation and communication device is configured to block and permit the in-home network signals at least partially depending on the in-home network signals being in the second frequency band and not in the first frequency band, in addition to depending on the direction in which the in-home network signals are travelling.

8. The entry device of claim 5, further comprising an in-home network signal blocking device that is upstream of the first splitter and downstream of the entry port, wherein the in-home network signal blocking device is configured to block and permit passage of signals depending on a frequency of the signals and not a direction of the signals.

9. The entry device of claim 8, wherein the in-home network signal blocking device is configured to permit passage of external network signals and to block in-home network signals.

10. The entry device of claim 8, wherein the in-home network signal blocking device comprises a low-pass filter.

11. The entry device of claim 5, further comprising a second splitter electrically connected with the second leg of the first splitter, the second splitter having a plurality of output legs each being electrically connected to a respective second network port of the plurality of second network ports, wherein the second splitter is configured to provide bidirectional communication of in-home network signals among the plurality of second network ports.

12. The entry device of claim 11, wherein the signal attenuation and communication device comprises one or more directional couplers, and at least one of the one or more directional couplers is connected upstream of the second splitter and downstream of the first splitter.

13. The entry device of claim 11, wherein the signal attenuation and communication device comprises one or more directional couplers, and at least one of the one or more directional couplers of the signal attenuation and communication device are connected upstream of the second splitter and downstream of the first splitter.

14. The entry device of claim 11, wherein the signal attenuation and communication device comprises one or more directional couplers, and the one or more directional couplers comprise:
a first directional coupler having a coupled port, an input port electrically connected to the second splitter, a through port electrically connected to the first splitter, and an isolated port that is terminated; and
a second directional coupler having a coupled port electrically connected to the coupled port of the first directional coupler, an input port electrically connected to the first network port, a through port electrically connected to the first splitter, and an isolated port that is terminated.

15. The entry device of claim 14, wherein the first and second directional couplers are configured to transmit in-home network signals therebetween via a pathway between the coupled port of the first directional coupler and the coupled port of the second directional coupler.

16. The entry device of claim 15, wherein the external network signals are all in a first frequency band and the in-home network signals are all in a second frequency band that is higher than the first frequency band.

17. The entry device of claim 16, wherein the first frequency band is 5-1002 MHz, and wherein the second frequency band is 1125-1675 MHz.

18. The entry device of claim 5, wherein the signal attenuation and communication device comprises one or more amplifiers configured to amplify external network signals.

* * * * *